United States Patent
Russell et al.

(10) Patent No.: US 11,146,862 B2
(45) Date of Patent: Oct. 12, 2021

(54) GENERATING TAGS FOR A DIGITAL VIDEO

(71) Applicant: Adobe Inc., San Jose, CA (US)

(72) Inventors: Bryan Russell, San Francisco, CA (US); Ruppesh Nalwaya, Sunnyvale, CA (US); Markus Woodson, Santa Clara, CA (US); Joon-Young Lee, Miliptas, CA (US); Hailin Jin, San Jose, CA (US)

(73) Assignee: ADOBE INC., San Jose, CA (US)

( * ) Notice: Subject to any disclaimer, the term of this patent is extended or adjusted under 35 U.S.C. 154(b) by 6 days.

(21) Appl. No.: 16/386,031

(22) Filed: Apr. 16, 2019

(65) Prior Publication Data

US 2020/0336802 A1 Oct. 22, 2020

(51) Int. Cl.
| | |
|---|---|
| *H04N 21/81* | (2011.01) |
| *H04N 21/845* | (2011.01) |
| *G06N 3/08* | (2006.01) |
| *G06K 9/00* | (2006.01) |

(52) U.S. Cl.
CPC ..... *H04N 21/8133* (2013.01); *G06K 9/00744* (2013.01); *G06N 3/08* (2013.01); *H04N 21/8456* (2013.01)

(58) Field of Classification Search
CPC .. H04N 21/8133; H04N 21/8456; G06K 9/00; G06K 9/00744; G06N 3/08
See application file for complete search history.

(56) References Cited

U.S. PATENT DOCUMENTS

| | | | |
|---|---|---|---|
| 2010/0088726 A1* | 4/2010 | Curtis | H04N 21/8456 725/45 |
| 2011/0205359 A1* | 8/2011 | Lee | G06T 7/285 348/143 |
| 2017/0047096 A1* | 2/2017 | Li | G06K 9/00302 |
| 2017/0236032 A1 | 8/2017 | Lin et al. | |
| 2018/0082122 A1* | 3/2018 | Verdejo | H04N 7/188 |
| 2018/0144184 A1* | 5/2018 | Frischholz | G06K 9/00597 |
| 2018/0267997 A1 | 9/2018 | Lin et al. | |
| 2019/0108242 A1* | 4/2019 | Liu | G06K 9/00671 |
| 2019/0108396 A1* | 4/2019 | Dal Mutto | G06T 7/174 |
| 2019/0258671 A1* | 8/2019 | Bou | G06K 9/00751 |
| 2019/0377823 A1* | 12/2019 | Boquet | G06N 3/08 |

\* cited by examiner

*Primary Examiner* — Joshua D Taylor
(74) *Attorney, Agent, or Firm* — Keller Jolley Preece

(57) ABSTRACT

Systems, methods, and non-transitory computer-readable media are disclosed for automatic tagging of videos. In particular, in one or more embodiments, the disclosed systems generate a set of tagged feature vectors (e.g., tagged feature vectors based on action-rich digital videos) to utilize to generate tags for an input digital video. For instance, the disclosed systems can extract a set of frames for the input digital video and generate feature vectors from the set of frames. In some embodiments, the disclosed systems generate aggregated feature vectors from the feature vectors. Furthermore, the disclosed systems can utilize the feature vectors (or aggregated feature vectors) to identify similar tagged feature vectors from the set of tagged feature vectors. Additionally, the disclosed systems can generate a set of tags for the input digital videos by aggregating one or more tags corresponding to identified similar tagged feature vectors.

20 Claims, 15 Drawing Sheets

GENERATING TAGS FOR A DIGITAL VIDEO

BACKGROUND

Recent years have seen a rapid increase in the number of digital videos available on electronic devices and the Internet. In particular, an increasing number of digital videos are made available to individuals and businesses. For instance, the ease of capturing high quality videos on mobile devices, such as smart phones, has led to individual and user capturing and storing large quantities of videos. Furthermore, users may desire to find a particular video or portions of a particular video. For example, a user may desire to find a video of particular object or action. Although conventional digital visual systems enable users to capture, view, modify, describe, and upload digital visual media, they also have a number of significant shortcomings, particularly in regard to searching for or otherwise retrieving videos.

SUMMARY

This disclosure describes one or more embodiments that provide benefits with systems, computer-readable media, and methods that accurately generate tags for digital videos. In particular, the disclosed systems can automatically generate tags for digital videos to indicate objects, scenes, attributes, and actions within the videos. For example, the disclosed systems intelligently identify actions being performed in videos and associated tags for the actions with the videos rather than just static attributes. Furthermore, the disclosed systems can tag entire videos or temporal portions of videos. In this manner, the disclosed systems can allow efficient and accurate searching and retrieving of desired videos or desired portions of videos.

For example, in order to automatically tag a video, in one or more embodiments, the disclosed systems can extract a set of frames from the video. The disclosed systems then can generate feature vectors for the set of frames utilizing a neural network. The disclosed systems can then select one or more tagged feature vectors from a set of tagged feature vectors based on distances between the feature vectors and the one or more tagged feature vectors. The disclosed systems can also generate a set of tags to associate with the video by aggregating one or more tags corresponding to the one or more tagged feature vectors.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
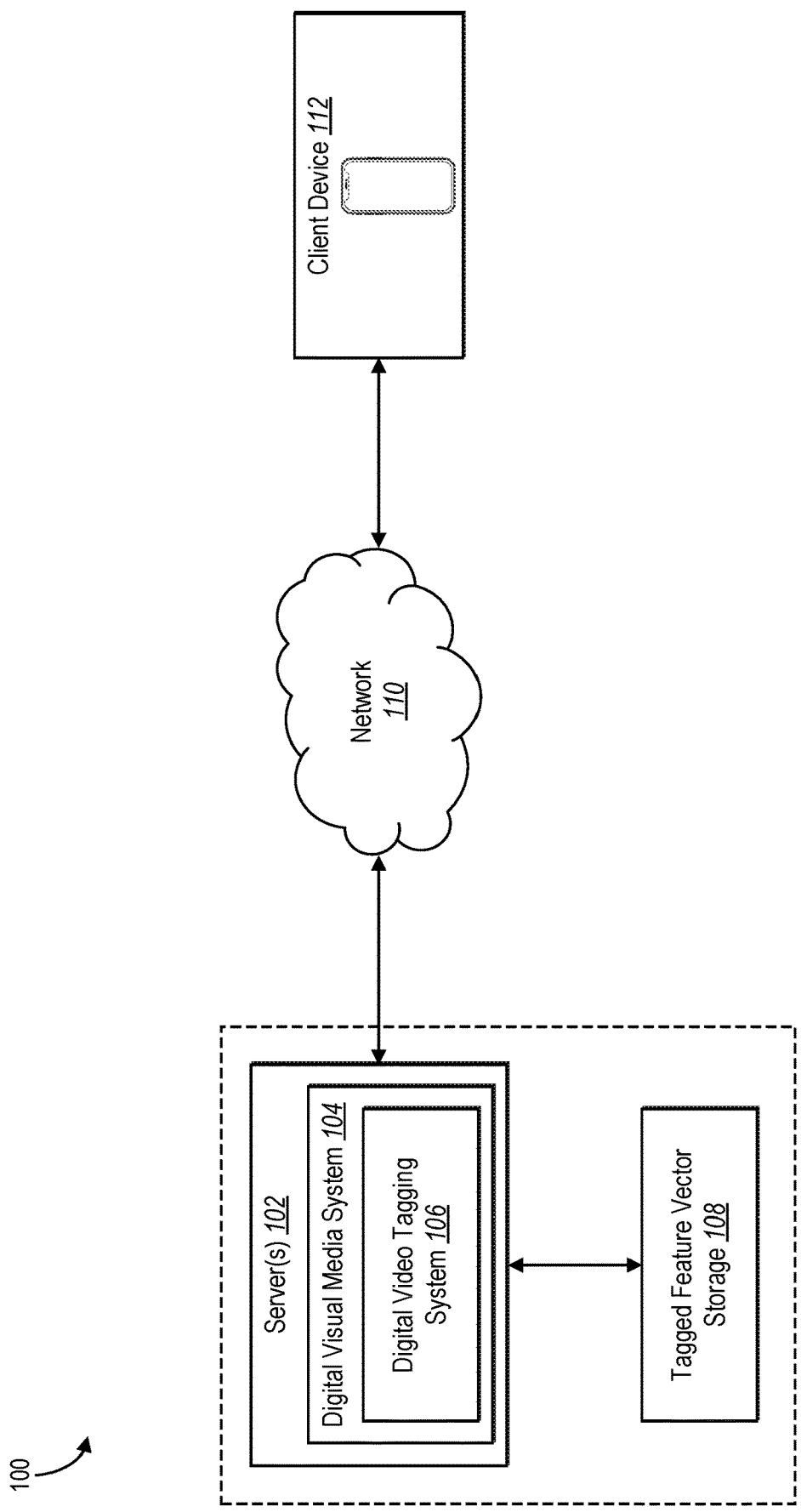
FIG. 1 illustrates a schematic diagram of an example environment in which a digital video tagging system can operate in accordance with one or more embodiments.

One or more embodiments of the present disclosure include a digital video tagging system that can use machine learning to automatically identify actions, objects, scenes, and/or other attributes in digital media (e.g., digital videos or images) and tag the digital media based on the identified attributes. In other words, the digital video tagging system can automatically tag digital videos. By automatically tagging digital videos, the digital video tagging system can enable search and retrieval of relevant videos in large collections or identification of portions of a digital video having particular attributes.

In one or more embodiments, the digital video tagging system can identify a set of action-rich digital videos and generate a set of tagged feature vectors from the set of action-rich digital media. In particular, in one or more embodiments, the digital video tagging system can generate a set of tagged feature vectors from digital media content items, such as digital videos and/or digital images. For example, the digital video tagging system can identify digital videos that portray one or more actions (e.g., action-rich digital videos) to generate the tagged feature vectors. Then, the digital video tagging system can, utilizing a neural network, generate feature vectors for the action-rich digital videos. Upon generating the feature vectors for the action-rich digital videos, the digital video tagging system can utilize metadata (e.g., indications of attributes) associated with the action-rich digital videos to tag the generated feature vectors to generate the tagged feature vectors. The digital video tagging system can utilize the tagged feature vectors to automatically generate tags for untagged digital videos or retrieve a digital video or image in response to a tag-based query.

For example, in order to automatically tag a video, in one or more embodiments, the digital video tagging system can extract frames from a digital video. The digital video tagging system can utilize a neural network to generate feature vectors from the set of frames. The digital video tagging system can also optionally combine the generated feature vectors to generate an aggregated feature vector for the digital video or segments of the digital video. Upon generating the feature vectors (or aggregated feature vector(s)), the digital video tagging system can identify one or more tagged feature vectors that are similar to the feature vectors (or aggregated feature vector). Then, the digital video tagging system can generate a set of tags to associate with the digital video by aggregating one or more tags corresponding to the selected tagged feature vectors.

Unlike many conventional systems, by utilizing action-rich digital videos to generate the tagged feature vectors, the digital video tagging system can allow for identification of digital media (e.g., digital images or videos) including actions rather than just objects and scenes. In other words, in one or more embodiments, the digital video tagging system allows for more robust searching of digital videos.

Additionally, in one or more embodiments, the digital video tagging system can generate aggregated feature vectors. For example, the digital video tagging system can combine feature vectors for a set of frames utilizing techniques such as max pooling. In some embodiments, the digital video tagging system generates multiple aggregated feature vectors from groupings of feature vectors generated for a digital video. The groupings of feature vectors can correspond to video frames in segments of videos. The digital video tagging system can then identify tags for the segments based on the aggregated feature vectors. By tagging segments of videos, the digital video tagging system can enable the digital video to be searchable based on the set of tags and/or can enable the digital video to display and/or indicate specific tags at specific segments of the digital video.

Still further, the digital video tagging system can associate tags with temporal segments of videos. In particular, as mentioned above, the digital video tagging system can generate aggregated feature vectors corresponding to groups of frames. The groups of frames can be grouped chronologically. Thus, each aggregated feature vector can represent a temporal segment of a video. The digital video tagging system can then associate tags generated from each aggregated feature vector with the associated temporal segment of the video. One will appreciate in light of the disclosure herein the temporal tagging of videos can allow a user to find a portion of a video having a desired characteristic without having to video the entire video. For example, in a video of a dog, a user can search for the term "jumping," in response, the digital video tagging system can identify and surface one or more temporal segments of the video in associated with the tag "jumping" without requiring the user to view other portions of the video searching for the segment(s) in which the dog is jumping.

As mentioned above, conventional tagging systems have a number of shortcomings. For instance, conventional tagging systems oftentimes cannot easily, accurately, and/or efficiently generate tags for digital videos based on objects, scenes, actions, and/or attributes portrayed in the digital videos. Indeed, some conventional tagging systems can generate tags for digital images, however fail to easily, accurately, and/or efficiently generate tags for digital videos. For instance, conventional tagging systems oftentimes are configured to determine tags from a single still instance portrayed in a digital image. However, such conventional tagging systems oftentimes cannot identify and generate tags for actions portrayed in digital videos because such conventional tagging systems are configured to determine tags from the single instance. As a result, conventional tagging systems often fail to easily, accurately, and/or efficiently generate tags for digital videos because digital videos may portray a variety of objects, scenes, actions, and/or attributes across a number of frames.

Indeed, generating such tags may provide a more accurate description of content within digital videos. However, as conventional tagging systems oftentimes collect thousands or millions of digital videos without generating accurate tags for the digital videos, the collection of digital videos may be too difficult to manage and/or search. For example, some conventional tagging systems can fail to enable users to accurately search through and/or organize large collections of digital videos because they are incapable of easily, accurately, and/or efficiently generating tags for digital videos. Additionally, some conventional tagging systems also fail to enable computer systems to utilize accurately generated tags for digital videos to gain functionality such as the capability to understand content within the digital videos. Furthermore, using conventional system it can be difficult and time intensive to find a desired portion of a video. In summary, conventional tagging systems are often inflexible, inaccurate, and inefficient.

The digital video tagging system of one implementations of the present disclosure provides advantages and benefits over conventional systems and methods by generating tags for digital videos by utilizing the feature vectors (or aggregated feature vectors) from the set of frames of the digital videos. For example, by generating accurate tags that describe actions, objects, scenes, and/or attributes portrayed within the content of digital videos, the digital video tagging system can enable increased flexibility, efficiency, and accuracy in searching within and/or organizing large collections of digital videos. Indeed, by associating accurate tags to digital videos (and/or with segments of digital videos), the digital video tagging system can provide digital videos with tags that describe more aspects of the content portrayed in the digital videos compared to some user provided descriptions for digital videos. Furthermore, the digital video tagging system can enable users to search for digital videos from large collections of digital videos with more specificity and/or to organize digital videos in more efficient categories (based on the tags).

Additionally, by utilizing action-rich videos for generating the tagged feature vectors and/or by generating an aggregated feature vector from the set of frames of a digital video, the digital video tagging system can accurately identify actions portrayed in digital videos and generate tags for those actions. Indeed, by enabling the tagging of digital videos with such action based tags, the digital video tagging system can enable searching and/or organizing digital videos based on actions portrayed in the digital videos. As mentioned above, some conventional digital visual media tagging systems, in contrast, fail to accurately identify and tag actions portrayed in digital videos because individual frames may not fully portray an action.

As a further benefit, the digital video tagging system can also enable computer systems to understand content of digital videos and, as a result, provide more robust functionalities for digital videos. For instance, by generating accurate tags that describe a variety of characteristics portrayed within the digital videos (e.g., actions, objects, scenes, and/or attributes), the digital video tagging system can enable computer systems to identify content portrayed within digital videos (e.g., identifying what is occurring within the digital videos) and provide functionalities based on the identified content. For instance, the digital video tagging system can enable computer systems to provide specific tags at specific segments of digital videos, and thus, search for segments of videos portraying desired actions.

As illustrated by the foregoing discussion, the present disclosure utilizes a variety of terms to describe features and advantages of the digital video tagging system. Additional detail is now provided regarding the meaning of such terms. For example, as used herein, the term "media content item" (or sometimes referred to as "media content item," "digital media content item," and/or "digital visual media content item") refers to any digital visual representation of an object, scene, story, event, picture, illustration, icon, symbol or other content. As an example, a media content item can include, but is not limited to, a digital video and/or a digital image. The term "digital video" can include any moving visual representation (or image) of a story, event, picture, illustration, icon, and/or symbol. To illustrate, a digital video can include, but is not limited to, a digital file with the following file extensions: FLV, SWF, AVI, WMV, MOV, QT, MKV, MP4, or AVCHD.

Furthermore, as used herein, the term "frame" (sometimes referred to as "video frame" or "digital video frame") refers to a visual representation of a single portion or instance from a video. In particular, the term "frame" can include a digital image of a still image which is a segment (or instance) of a video. To illustrate, a frame can include a digital image. Indeed, a digital image can include, but is not limited to, a digital file with the following extensions: JPG, TIFF, BMP, PNG, RAW, or PDF.

As used herein, the term "neural network" refers to a machine learning model that can be tuned (e.g., trained) based on inputs to approximate unknown functions. In particular, the term "neural network" can include a model of interconnected layers that communicate and analyze attributes at varying degrees of abstraction to learn to approximate complex functions and generate outputs based on a plurality of inputs provided to the model. For instance, the term "neural network" includes one or more machine learning algorithms (or models). In particular, the term "neural network" includes deep convolutional neural networks (e.g., "CNNs") and fully convolutional neural networks (e.g., "FCNs"). In other words, a neural network includes an algorithm that implements deep learning techniques, i.e., machine learning that utilizes a set of algorithms to attempt to model high-level abstractions in data.

Additionally, as used herein, the term "feature vector" refers to a set of values representing characteristics and/or attributes (i.e., features) of content such as content of a digital video, digital video frame, and/or a digital image. In particular, the term "feature vector" includes a set of values corresponding to latent and/or patent attributes and/or characteristics (i.e., visual features) related to a digital video, digital video frame, and/or a digital image. In one or more embodiments, a feature vector is a multi-dimensional dataset that represents digital video, digital video frame, and/or a digital image feature. In the context of a digital video frame, a feature vector includes data representing characteristics (or features) of the pixels of the digital video frame. In one or more embodiments, a feature vector includes a set of numeric metrics learned by a machine learning algorithm.

Moreover, as used herein, the term "aggregated feature vector" refers to a combination of a plurality of feature vectors. In particular, the term "aggregated feature vector" includes a combination of a plurality of feature vectors from a plurality of frames corresponding to a digital video in accordance with one or more embodiments herein.

In addition, as used herein, the term "tagged feature vector" refers to a feature vector with one or more associated tags. In particular, the term "tagged feature vector" includes a feature vector that is labeled with (or assigned with) one or more tags. To illustrate, a tagged feature vector can include a feature vector, generated from a digital video portraying the act of "running," labeled (or assigned) with a tag "running." Alternatively, a tagged feature vector can comprise a word embedding of an associated tag. Still further, in one or more embodiments, a tagged feature vectors comprises a soft topic feature vector as disclosed in Lin et. al., U.S. Patent Pub. No. 2018/0267997 filed on Sep. 20, 2018, which is incorporated herein by reference in its entirety.

Furthermore, as used herein, the term "tag" refers to a description (or information) including one or more words and/or values. In particular, the term "tag" refers to a description, that represents an action, object, scene, attribute, and/or another aspect portrayed in a digital media content item (e.g., a digital video), with words and/or values. As an example, a tag can include text within metadata for a digital media content item. Furthermore, a tag can include text from a vocabulary (or dictionary) of actions, objects, attributes, and/or scenes.

As used herein, the term "distance" (sometimes referred to as "distance value") refers to one or more values representing a quantification of similarity between a plurality of objects. In particular, the term "distance" includes one or more values representing quantifications of similarities between a plurality of features of digital content items. To illustrate, a distance can include one or more values that represent a quantification of similarity between a plurality of feature vectors. Additional detail regarding distance values and determining similarities between feature vectors are provided in the figures below.

Turning now to the figures, FIG. 1 illustrates a schematic diagram of one embodiment of an exemplary environment 100 in which a digital video tagging system 106 can operate. As illustrated in FIG. 1, the exemplary environment 100 includes server(s) 102, a tagged feature vector storage 108, a network 110, and a client device 112. As further illustrated in FIG. 1, the server device(s) 102 and the client device 112 can communicate via the network 110. Although FIG. 1 illustrates the server device(s) 102 and the client device 112 communicating via the network 110, the various components of the environment 100 can communicate and/or interact via other methods (e.g., the server device(s) 102 and the client device 112 can communicate directly). Furthermore, although FIG. 1 illustrates the digital video tagging system 106 being implemented by a particular component and/or device within the environment 100, the digital video tagging system 106 can be implemented, in whole or in part, by other computing devices and/or components in the environment 100.

As shown in FIG. 1, the server device(s) 102 can include a digital visual media system 104 which further includes the digital video tagging system 106. In particular, the digital video tagging system 106 can generate tagged feature vectors, store the tagged feature vectors in the tagged feature vector storage 108, and/or receive tagged feature vectors from the tagged feature vector storage 108. Furthermore, the digital video tagging system 106 can generate one or more tags for one or more digital videos (e.g., digital videos received from the client device 112). Additionally, the digital video tagging system 106 can utilize generated tags for the one or more digital videos to enable functionalities for the one or more digital videos. Indeed, the digital video tagging system 106 can generate tagged feature vectors, generate one or more tags for one or more digital videos, and/or enable functionalities for the one or more digital videos based on generated tags in accordance with one or more embodiments described herein.

Moreover, as illustrated in the embodiment of FIG. 1 and as mentioned above, the server (s) 102 can communicate with the tagged feature vector storage 108. In particular, the tagged feature vector storage 108 can store tagged data such as, but not limited to tagged feature vectors and/or tagged digital videos. Indeed, the digital video tagging system 106 can utilize the tagged data stored on the tagged feature vector storage 108 for generating a tag for a digital video and training a variety of components of the digital video tagging system 106. Furthermore, although FIG. 1 illustrates the tagged feature vector storage 108 communicating with the server device(s) 102, the tagged feature vector storage 108 can receive tagged feature vectors (or other tagged data) from any of or any combination of the digital video tagging system 106, other components of the server device(s) 102, the network 110, and/or the client device 112. Moreover, the server device(s) 102 and/or the tagged feature vector storage 108 can include a variety of types of computing devices, including those explained below with reference to FIG. 13.

Additionally, as mentioned above and as shown in FIG. 1, the environment 100 includes the client device 112. In one or more embodiments, the client device 112 may include, but is not limited to, a mobile device (e.g., smartphone, tablet), a laptop, a desktop, or any other type of computing device, including those explained below with reference to FIG. 13. Furthermore, although not shown in FIG. 1, the client device 112 can be operated by a user to perform a variety of functions. In particular, the client device 112 can perform functions such as, but not limited to, creating, storing, uploading, and/or modifying a variety of digital media content items (e.g., a digital video). For example, the client device 112 can communicate with the server device(s) 102 via the network to provide one or more digital videos to the server device(s) 102. Additionally, the client device 112 can request tags for a digital video, interact with digital videos on the server device(s) 102 and/or the network 110, and/or conduct search queries for digital videos which include tags on the server device(s) 102 and/or the network 110. Although FIG. 1 illustrates the environment with the client device 112, the environment 100 can include a plurality of client devices.

Additionally, as shown in FIG. 1, the exemplary environment 100 includes the network 110. As mentioned above, the network 110 can enable communication between components of the environment 100. Although not shown in FIG. 1, the network 110 can also communicate with the tagged feature vector storage 108. In one or more embodiments, the network 110 may include the Internet or World Wide Web. Additionally, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 102, the tagged feature vector storage 108, the client device 112, and the network 110 may communicate using any communication platforms and technologies suitable for transporting data and/or communication signals, including any known communication technologies, devices, media, and protocols supportive of data communications, examples of which are described with reference to FIG. 13.

Figure 2:
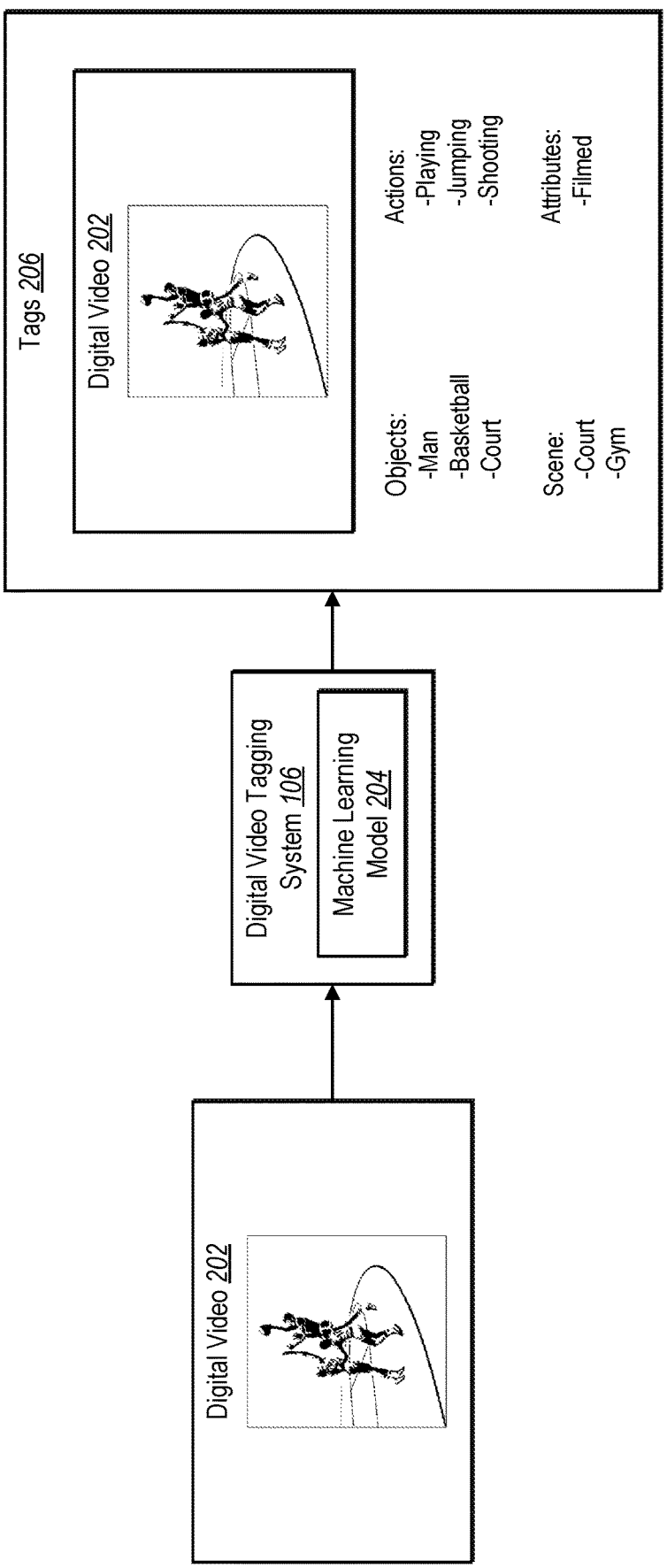
FIG. 2 illustrates an overview of the digital video tagging system generating tags for a digital video in accordance with one or more embodiments.

As mentioned above, the digital video tagging system 106 can generate one or more tags for a digital video. For example, FIG. 2 illustrates an example of the digital video tagging system 106 generating tags for a digital video. In particular, FIG. 2 illustrates a simplified exemplary scenario for aid in illustration of one or more aspects of one or more embodiments of the digital video tagging system 106. A more detailed description of the acts performed by the digital video tagging system 106 are discussed in reference to FIGS. 3-10.

As shown in FIG. 2, the digital video tagging system 106 can analyze a digital video 202 to generate tags 206 for the digital video 202. For example, as illustrated in FIG. 2, the digital video tagging system 106 can analyze the digital video 202 to identify, generate, and/or associate the tags 206 with the digital video 202. Indeed, in order to generate the tags 206, the digital video tagging system 106 can utilize a machine learning model 204 and/or other components to generate feature vectors from the digital video 202 and/or to identify similar tagged feature vectors to the feature vectors from the digital video 202 in accordance with one or more embodiments described herein. For example, in one or more embodiments, the digital video tagging system 106 includes multiple machine learning models 204. In particular, in one or more embodiments, the digital video tagging system 106 includes a first machine learning model trained to tag digital videos or images with tags corresponding to objects, scenes, and attributes. Additionally, the digital video tagging system 106 can include a second machine learning model trained to tag digital videos with tags corresponding to actions. In such embodiments, the second machine learning model can be trained using action-rich digital videos.

FIG. 2 illustrates the digital video tagging system 106 receiving the digital video 202, which includes content related to basketball. Furthermore, as shown in FIG. 2, the digital video tagging system 106 generates tags 206 that represent objects, actions, scenes, and attributes portrayed in the digital video 202. Specifically, as shown in FIG. 2, the digital video tagging system 106 generates tags 206 which include object tags (e.g., "man," "basketball," and "court"), action tags (e.g., "playing," "jumping," and "shooting"), scene tags (e.g., "court" and "gym"), and attribute tags (e.g., "filmed") for the digital video 202.

Figure 3:
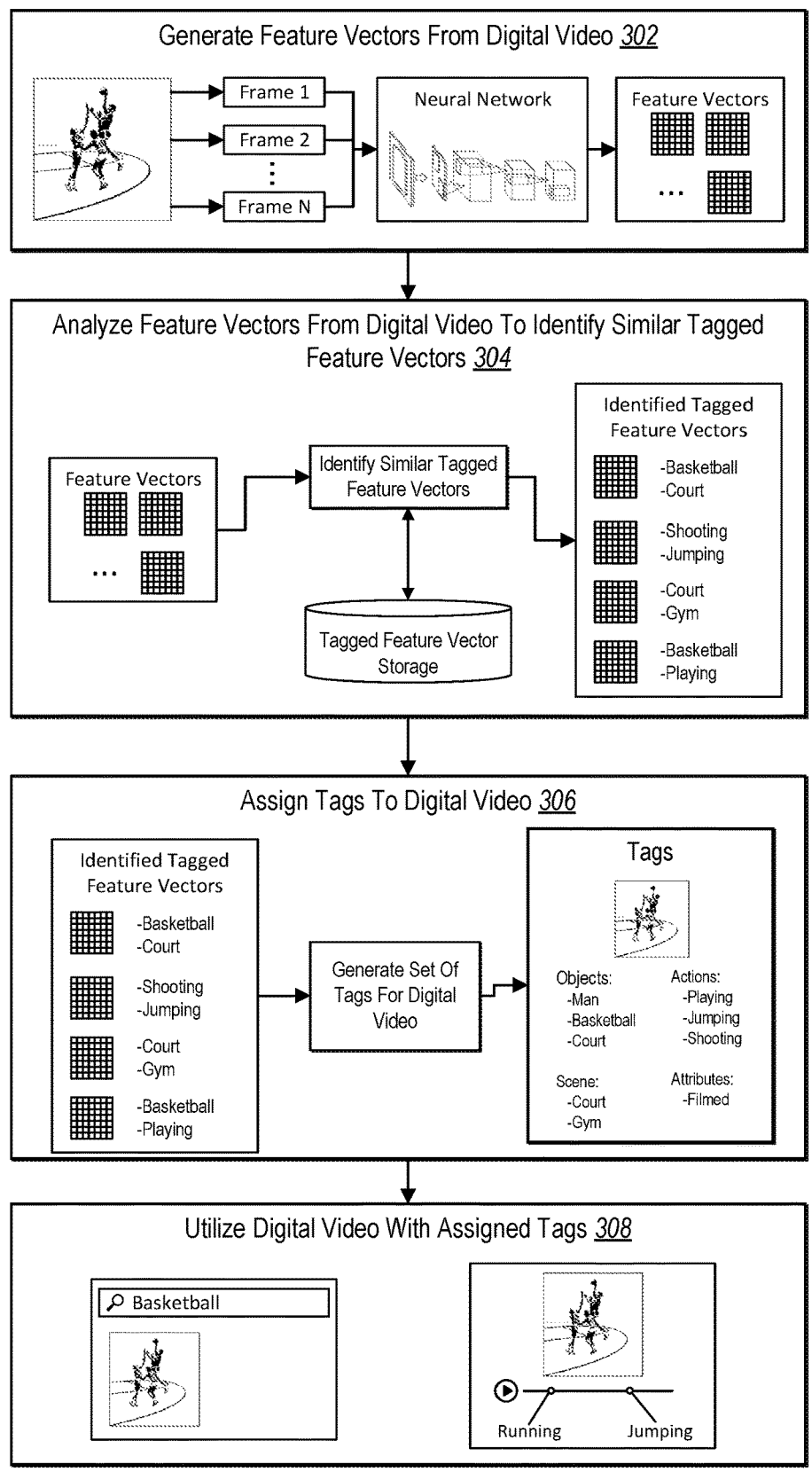
FIG. 3 illustrates a more detailed overview of the digital video tagging system generating tags for a digital video in accordance with one or more embodiments.

As mentioned above, the digital video tagging system 106 can generate one or more feature vectors for a digital video, utilize the feature vectors to generate tags for the digital video, assign tags to the digital video, and/or utilize the tags assigned to the digital video to enable functionalities in association with the digital video. For instance, FIG. 3 illustrates an overview of a sequence of acts that the digital video tagging system 106 can perform in relation to generating one or more tags for a digital video. More specifically, FIG. 3 illustrates an overview of a sequence of acts that the digital video tagging system 106 can perform in relation to a digital video such as generating feature vectors, generating tags, assigning tags, and/or utilizing the tags assigned to the digital video to enable functionalities for the digital video.

For instance, as shown in FIG. 3, the digital video tagging system 106 can perform an act 302 of generating feature vectors from a digital video. For instance, the digital video tagging system 106 can extract one or more frames from a digital video. Additionally, the digital video tagging system 106 can utilize a neural network to generate a set of feature vectors for the extracted frames. In one or more embodiments, the digital video tagging system 106 combines the set of feature vectors by utilizing a variety of methods to generate one or more aggregated feature vectors prior to generating tags for the digital video from the one or more aggregated feature vectors. Indeed, implementations of the digital video tagging system 106 generating feature vectors from a digital video are described in greater detail in FIGS. 5-8.

Furthermore, FIG. 3 illustrates the digital video tagging system 106 performing an act 304 of analyzing the feature vectors from the digital video to identify similar tagged feature vectors. For example, the digital video tagging system 106 can utilize the one or more generated feature vectors (or aggregated feature vectors) from act 302 to identify similar tagged feature vectors from a set of tagged feature vectors. Indeed, the digital video tagging system 106 can utilize a variety of methods (as described in greater detail in FIGS. 5-8) to compare the one or more generated feature vectors to the set of tagged feature vectors to identify tagged feature vectors that are similar to the one or more generated feature vectors from the digital video. Implementations of the digital video tagging system 106 generating tagged feature vectors are described in greater detail in FIG. 4.

Additionally, as illustrated in FIG. 3, the digital video tagging system 106 can perform an act 306 of assigning tags to the digital video. For instance, the digital video tagging system 106 can utilize the identified tagged feature vectors from act 304 to generate a set of tags for a digital video. In particular, the digital video tagging system 106 can aggregate the tags corresponding to the identified tagged feature vectors and assign these tags to the digital video. Furthermore, in some embodiments, the digital video tagging system 106 can assign tags to segments (e.g., frames or sets of frames) of the digital video. Indeed, implementations of the digital video tagging system 106 generating a set of tags for a digital video and assigning tags to the digital video are described in greater detail in FIGS. 5-8.

Moreover, as shown in FIG. 3, the digital video tagging system 106 can perform an act 308 of utilizing the digital video with the assigned tags. For instance, the digital video tagging system 106 can utilize the tags assigned to a digital video to enable searching capabilities for the digital video based on the assigned tags, organize the digital video within a collection of digital videos, and/or display tags that are relevant to frames of a digital video while a computing device displays the digital video. Implementations of the digital video tagging system 106 utilizing a digital video with assigned tags are described in greater detail in FIGS. 9 and 10.

Figure 4:
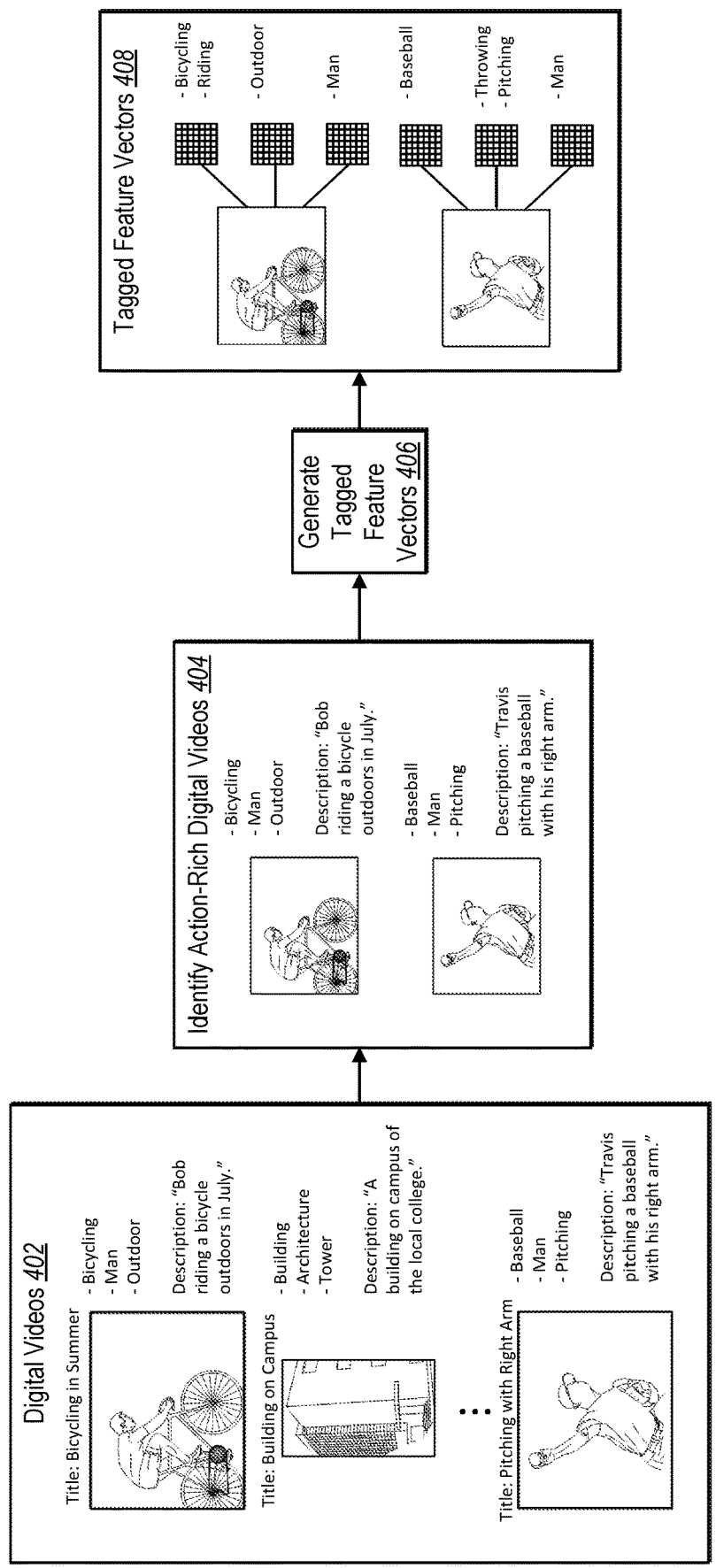
FIG. 4 illustrates a process of generating tagged feature vectors in accordance with one or more embodiments.

As mentioned above, the digital video tagging system 106 can identify digital videos to generate tagged feature vectors. For instance, FIG. 4 illustrates the digital video tagging system 106 generating tagged feature vectors. In particular, the digital video tagging system 106 can generate tagged feature vectors from digital videos (e.g., training digital videos) that include metadata corresponding to descriptions of the digital video (e.g., a title, labeled keywords, a description of the content portrayed in the video). For example, the digital video tagging system 106 can receive a plurality of digital videos, identify digital videos from the received digital videos that portray actions (e.g., action-rich videos), generate tagged feature vectors from those digital videos, and store the tagged feature vectors in a tagged feature vector storage 108. Indeed, the digital video tagging system 106 can utilize the tagged feature vectors while (automatically) generating tags for input digital videos (e.g., untagged digital videos).

In one or more embodiments, the digital video tagging system 106 can receive (or utilize) digital videos from a variety of digital video collections to utilize in generating tagged feature vectors. For example, the digital video tagging system 106 can utilize a collection of digital videos such as digital videos from ADOBE® STOCK®. In one or more embodiments, the digital video tagging system 106 can utilize digital videos that are uploaded to one or more online services (e.g., video sharing websites) and/or other training digital video repositories (e.g., publicly available data such as data including publicly available videos which include action based tags). Moreover, the digital video tagging system 106 can utilize any number of digital videos to generate the tagged feature vectors.

More specifically, the digital video tagging system 106 can receive (or utilize) digital videos that include information corresponding to the content of the digital videos to generate the tagged feature vectors. For instance, the digital video tagging system 106 can utilize digital videos that include metadata that corresponds to a description of the content of the digital videos. For instance, in one or more embodiment, the digital video tagging system utilizes digital videos that include metadata such as keyword tags (or labels), text descriptions of the content of the digital videos, and/or titles. Indeed, in one or more embodiments, the digital video tagging system 106 can receive digital videos that include the above-mentioned metadata, labelled by one or more persons.

As an example, FIG. 4 illustrates the digital video tagging system 106 utilizing a collection of digital videos that include metadata information. For instance, as shown in FIG. 4, the digital videos 402 include a plurality of digital videos with corresponding metadata. Indeed, as illustrated in FIG. 4, the digital videos 402 include digital videos titled "Bicycling in Summer," "Skyscrapers," and "Pitching with your right hand." Furthermore, as illustrated in FIG. 4, a first digital video from the digital videos 402 includes metadata such as the keywords "bicycling," "man," "wheels," "outdoor," "riding" and the description "Bob bicycling outdoors in July." Additionally, FIG. 4 also illustrates that a second digital video from the digital videos 402 includes metadata such as the keywords "architecture" and "tower." Moreover, FIG. 4 also illustrates that a third digital video from the digital videos 402 includes metadata such as the keywords "baseball," "throwing," "pitching," "man" and the description "Travis pitching a fast ball with his right hand." Although FIG. 4 illustrates a limited number of videos in digital videos 402, the digital video tagging system 106 can utilize a set of any number of digital videos.

Furthermore, the digital video tagging system 106 can identify digital videos that portray one or more actions (e.g., action-rich digital videos) to generate tagged feature vectors from action-rich digital videos. Indeed, action-rich digital videos may include digital videos that are determined, by the digital video tagging system 106, to have a high probability of including portrayals of one or more actions. Furthermore, the digital video tagging system 106 can utilize action-rich digital videos to generate tagged feature vectors that more accurately represent one or more action tags (e.g., tags representing an action). Specifically, the digital video tagging system 106 can identify digital videos, from a set of digital videos (e.g., digital videos 402), that portray one or more actions based on metadata associated with the set of digital videos.

For example, the digital video tagging system 106 can utilize a variety of methods for identifying action-rich digital videos based on the metadata associated with the set of digital videos. For instance, in one or more embodiments, the digital video tagging system 106 identifies words ending with gerunds from the metadata associated with the set of digital videos and utilizes the digital videos which include those words. In particular, the digital video tagging system 106 analyzes the metadata associated with the set of digital videos and identifies the digital videos that include one or more words that include gerunds and/or words that are verbs in the metadata (e.g., words ending in "-ing"). For example, the digital video tagging system 106 can identify a digital video as an action-rich digital video if the digital video includes a word that includes a gerund, such as "running," in the metadata (e.g., the title).

Additionally, the digital video tagging system 106 can utilize a variety of natural language parsing (or processing) ("NLP") algorithms to identify action-rich digital videos based on the metadata associated with the set of digital videos. For instance, the digital video tagging system 106 can utilize NLP algorithms to determine that metadata associated with a digital video is describing and/or related to one or more actions. Indeed, the digital video tagging system 106 can utilize NLP algorithms to determine that metadata associated with a digital video is describing and/or related to one or more actions and identify such a digital video as an action-rich digital video.

As an example, FIG. 4 illustrates the digital video tagging system identifying action-rich digital videos from a set of digital videos. In particular, as shown in FIG. 4, the digital video tagging system 106 identifies action-rich digital videos in act 404 from the digital videos 402. For instance, as illustrated in the implementation of FIG. 4, the digital video tagging system 106 identifies the first digital video (e.g., the digital video titled "Bicycling in summer") and the third digital video (e.g., the digital video titled "Pitching with your right arm") from the digital videos 402 as action-rich digital videos in act 404 based on the metadata associated with those digital videos. Specifically, the identified action-rich digital videos in act 404 include metadata that includes one or more verbs and/or gerunds.

Furthermore, the digital video tagging system 106 can generate tagged feature vectors from the digital videos that include metadata information. For instance, FIG. 4 illustrates the digital video tagging system 106 generating tagged feature vectors in act 406 for the identified action-rich digital videos from act 404. Indeed, the digital video tagging system 106 can generate feature vectors in act 406 for a set of frames from each of the action-rich videos from act 404 to generate the tagged feature vectors 408.

In particular, the digital video tagging system 106 can utilize a neural network (e.g., a neural network for image classification) to generate feature vectors from one or more frames of the digital videos that include the metadata information. Additionally, the digital video tagging system 106 can also generate one or more aggregated feature vectors and/or multiple aggregated feature vectors (for groups of similar frames and/or feature vectors) from each of the digital videos that include the metadata information. Indeed, the digital video tagging system 106 can generate the feature vectors, the aggregated feature vectors, and/or the multiple aggregated feature vectors (for groups of similar frames and/or feature vectors) from each of the digital videos that include the metadata information in accordance with one or more embodiments described herein (e.g., as described in FIGS. 5-8).

Upon generating the feature vectors from the one or more frames of the digital videos that include the metadata information, the digital video tagging system 106 can tag the feature vectors to generate the tagged feature vectors. For instance, the digital video tagging system 106 can utilize text from the metadata information associated with the digital videos to generate the tagged feature vectors. Indeed, as described in the figures below in greater detail, the digital video tagging system 106 can utilize a variety of methods to associate tags with feature vectors to generate tagged feature vectors.

Moreover, the digital video tagging system 106 can associate a variety of types of tags with a feature vector. Indeed, the digital video tagging system 106 can utilize a tag to represent one or more attributes such as, but not limited to, actions, objects, scenes, and/or attributes portrayed within a digital video. In some embodiments, the digital video tagging system 106 utilizes NLP algorithms to categorize words (or text) from metadata information associated with a digital video into a tag type such as, but not limited to, action tags, object tags, scene tags, and/or attribute tags. Although the one or more embodiments herein describe tags as action tags, object tags, scene tags, and/or attribute tags, the digital video tagging system 106 can utilize any category of attributes as a type of tag.

As mentioned above, the digital video tagging system 106 can utilize a variety of methods to associate tags with feature vectors to generate tagged feature vectors. For instance, the digital video tagging system 106 can associate the text from the metadata information as tags for the generated feature vectors (to create the tagged feature vectors). For example, the digital video tagging system 106 can utilize words from the metadata information of a digital video as tags and assign (or associate) these tags to each of the feature vectors (and/or aggregated feature vectors) generated from that digital video. For instance, the digital video tagging system 106 can utilize words from the metadata information of a digital video, assign a category to each of those words, and associate those words as tags to the feature vectors (or aggregated feature vectors) from that digital video to generate the tagged feature vectors.

Additionally, the digital video tagging system 106 can also associate specific words from the metadata information of a digital video with specific feature vectors generated from the digital video. In particular, the digital video tagging system 106 can utilize information from the metadata such as text that is tied to (or corresponds to) a segment of the digital video (e.g., a keyword with an assigned digital video time stamp) to assign the text to the feature vectors generated from the digital video frame that corresponds to the segment of the digital video. Indeed, the digital video tagging system 106 can utilize metadata information from a digital video that associates descriptions, keywords, labels, and/or any other information with a specific segment of the digital video to generate tags for each individual feature vector from different frames (or digital video segments).

In one or more embodiments, the digital video tagging system 106 utilizes clustering techniques when generating tagged feature vectors from a set of digital videos that include metadata information (e.g., user provided descriptions, keywords, and/or labels). For instance, the digital video tagging system 106 can utilize clustering techniques such as, but not limited to, K-Means clustering and/or recursive K-Means clustering to cluster the digital videos (or feature vectors) from the set of digital videos into clusters of a desirable size based on the similarity of the digital videos (or feature vectors). Indeed, clustering feature vectors can increase efficiencies in training and reduce overfitting when the digital video tagging system 106 utilizes the tagged feature vectors to generate (or predict) tags for an input digital video.

Additionally, the digital video tagging system 106 can utilize a voting scheme to reduce user labeling (or tagging) biases within the metadata information of the digital videos utilized to generate the tagged feature vectors. For example, the digital video tagging system 106 can determine how similar metadata information (e.g., user provided labels, keywords, and/or tags) for similar digital videos and/or similar feature vectors (from the clusters of digital videos and/or clusters of feature vectors determined utilizing clustering techniques) to consolidate and/or weight the metadata information to reduce user labeling (or tagging) bias. For instance, the digital video tagging system 106 can utilize a voting scheme such as, but not limited to, a k-nearest neighbors (KNN) voting scheme and/or a diversity based voting scheme (Div-KNN).

In one or more embodiments, the digital video tagging system 106 can utilize such clustering techniques and voting schemes to provide a relevance and/or confidence score to tags within a tagged feature vector. For example, the digital video tagging system 106 can determine a cluster-sensitive hashing distance (C-Hashing distance) that represents the number of times a set of tags are assigned to a cluster of feature vectors and/or digital videos (from clusters created using the clustering techniques described above). Indeed, the digital video tagging system 106 can generate tagged feature vectors that are associated with one or more clusters of feature vectors, associated with relevance and/or confidence scores of tags within those clusters, and/or C-hashing distances that enable calculations such as the probability of a set of tags co-occurring within a cluster of feature vectors. Indeed, the digital video tagging system 106 can utilize such information (e.g., the C-hashing distances and/or the confidence scores) to accurately generate tags for an input digital image from the tagged feature vectors. For example, additional detail regarding utilizing clustering techniques and/or voting schemes to generate a set of tagged feature vectors (or training data for the digital video tagging system 106) is provided in, Lin et. al., U.S. Patent Pub. No. 2017/0236032 filed on Aug. 17, 2017, which is incorporated herein by reference in its entirety.

Additionally, in some embodiments, the digital video tagging system 106 utilizes embedding learning when generating tagged feature vectors from a set of digital videos that include metadata information (e.g., user provided descriptions, keywords, and/or labels) to determine a relevance score for data from the metadata information. For example, the digital video tagging system 106 can generate feature vectors for digital videos that include metadata information and also generate a word vector from the metadata information. Additionally, the digital video tagging system 106 can utilize the generated word vector and calculated weights associated with the word vector to generate a soft topic feature vector. In particular, the soft topic feature vector can represent a summary of the keywords and/or other information from the metadata information associated with the digital video (e.g., one or more topics based from the tags identified from the metadata information). Moreover, the soft topic feature vector can be specific to a generated feature vector, aggregated feature vector, and/or a digital video frame.

Upon generating a feature vector and the soft topic feature vector, the digital video tagging system 106 can align, utilizing machine learning models such as a neural network, the feature vector and the soft topic feature vector into a common embedding space to compute a relevance score corresponding to each tag determined from the metadata information of the digital video. For instance, the digital video tagging system 106 can align the feature vector and soft topic feature vector (e.g., make them as close as possible to one another) by utilizing methods such as, but not limited to, cosine similarity loss. In addition, the digital video tagging system 106 can further utilize clustering techniques such as, but not limited to, K-means clustering, on the soft topics from the soft topic feature vector to generate hard topics to assign to the feature vector.

Indeed, the digital video tagging system 106 can generate soft topic feature vector for feature vectors from each digital video and align them to the respective feature vectors. Additionally, the digital video tagging system 106 can generate hard topics for each feature vector from soft topic feature vectors. In one or more embodiments, the digital video tagging system 106 utilizes the soft topic feature vectors, the embedding space between feature vectors and the soft topic feature vectors, and/or the hard topics in association with the feature vectors, aggregated feature vectors, and/or digital videos to generate the tagged feature vectors (and/or relevance scores for tags of the tagged feature vectors). Indeed, the digital video tagging system 106 can utilize the feature vectors, the soft topic feature vectors, the relevance scores for tags from the embedding space, and/or the hard topic assignments to generate tags for an input digital video (as described in greater detail in the figures below). Additional detail regarding utilizing soft topic feature vectors and embedding learning to generate a set of tagged feature vectors (or training data for the digital video tagging system 106) is provided in, Lin et. al., U.S. Patent Pub. No. 2018/0267997 filed on Sep. 20, 2018, which is incorporated herein by reference in its entirety.

Upon generating the tagged feature vectors, the digital video tagging system 106 can store the tagged feature vectors in a tagged feature vector storage (e.g., tagged feature vector storage 108). Indeed, the digital video tagging system 106 can include digital videos, metadata information of the digital videos, feature vectors for the digital videos, and/or tags associated with the feature vectors within the tagged feature vector storage. Furthermore, the digital video tagging system 106 can also include associations between digital video frames and the generated feature vectors, clustering information of the feature vectors, soft topic feature vectors of the feature vectors, embedding spaces of the feature vectors, and/or confidence (or relevance) scores for tags in association with the feature vectors.

Furthermore, in one or more embodiments, the digital video tagging system 106 can store the generated tagged feature vectors utilizing a query hash table. In particular, the digital video tagging system 106 can generate a query hash table that includes identifiers for each tagged feature vector (or tagged digital video). Additionally, the digital video tagging system 106 can associate the one or more tags associated with the tagged feature vectors within the query hash table (and/or an action-rich query hash table). Indeed, the digital video tagging system 106 can reference the query hash table when identifying tagged feature vectors that are similar to feature vectors generated from an input digital video (as described in greater detail in the figures below).

As an example, FIG. 4 illustrates that the digital video tagging system 106, after generating the tagged feature vectors in act 406, can store the tagged feature vectors as tagged feature vectors 408. Indeed, as shown in FIG. 4, the digital video tagging system 106 associates one or more generated feature vectors for each digital video (e.g., from the action-rich digital videos identified in act 404). Furthermore, the digital video tagging system 106 associates one or more tags (e.g., tags identified from the metadata information of the digital video 402) to the feature vectors in the tagged feature vectors 408. For instance, a first digital video (e.g., the digital video titled "Bicycling in summer") in tagged feature vectors 408 includes one or more generated feature vectors and tags (e.g., "bicycling," "riding," "outdoor," and "man") from the corresponding metadata information provided in digital videos 402. Similarly, a second digital video (e.g., the digital video titled "Pitching with your right arm") in tagged feature vectors 408 includes one or more generated feature vectors and tags (e.g., "baseball," "throwing," "pitching," and "man") from the corresponding metadata information provided in digital videos 402.

Although FIG. 4 illustrates the digital video tagging system 106 generating tagged feature vectors from action-rich digital videos, the digital video tagging system 106 can utilize any type of digital videos to generate tagged feature vectors. Additionally, the digital video tagging system 106 can generate tagged feature vectors with any type of tag from metadata information associated with digital videos, regardless of whether the digital video tagging system 106 utilizes action-rich digital videos, other types of digital videos, and/or all types of digital videos. For instance, the digital video tagging system 106 can generate tagged feature vectors that include any combination of action tags, object tags, scene tags, attribute tags, and/or other types of tags. In one or more embodiments, the digital video tagging system 106 utilizes separate sets of tagged feature vectors for each of and/or different combinations of tag types (e.g., a set of tagged feature vectors for action tags and a set of tagged feature vectors for object, scene, and attribute tags).

Furthermore, although FIG. 4 illustrates the digital video tagging system 106 utilizing digital videos to generate the tagged feature vectors, the digital video tagging system 106 can utilize any type of digital media content to generate the tagged feature vectors. For instance, the digital video tagging system 106 can utilize digital images (with associated metadata information) to generate tagged feature vectors for the digital video tagging system 106. Also, the digital video tagging system 106 can utilize any combination of digital media content items (e.g., digital videos and digital images) to generate the tagged feature vectors.

Furthermore, the digital video tagging system 106 can utilize a set of tagged feature vectors to train one or more machine learning models to generate tags for input digital videos. For instance, the digital video tagging system 106 can input digital videos corresponding to the tagged feature vectors (without the tagged information) into a machine learning model to generate tags for the digital videos in accordance with one or more embodiments herein. Additionally, the digital video tagging system 106 can compare the predicted (or generated) tags of the digital videos to the actual tagged feature vectors of those digital videos (e.g., utilizing a loss function) to configure and/or tune the machine learning model.

Figure 5A:
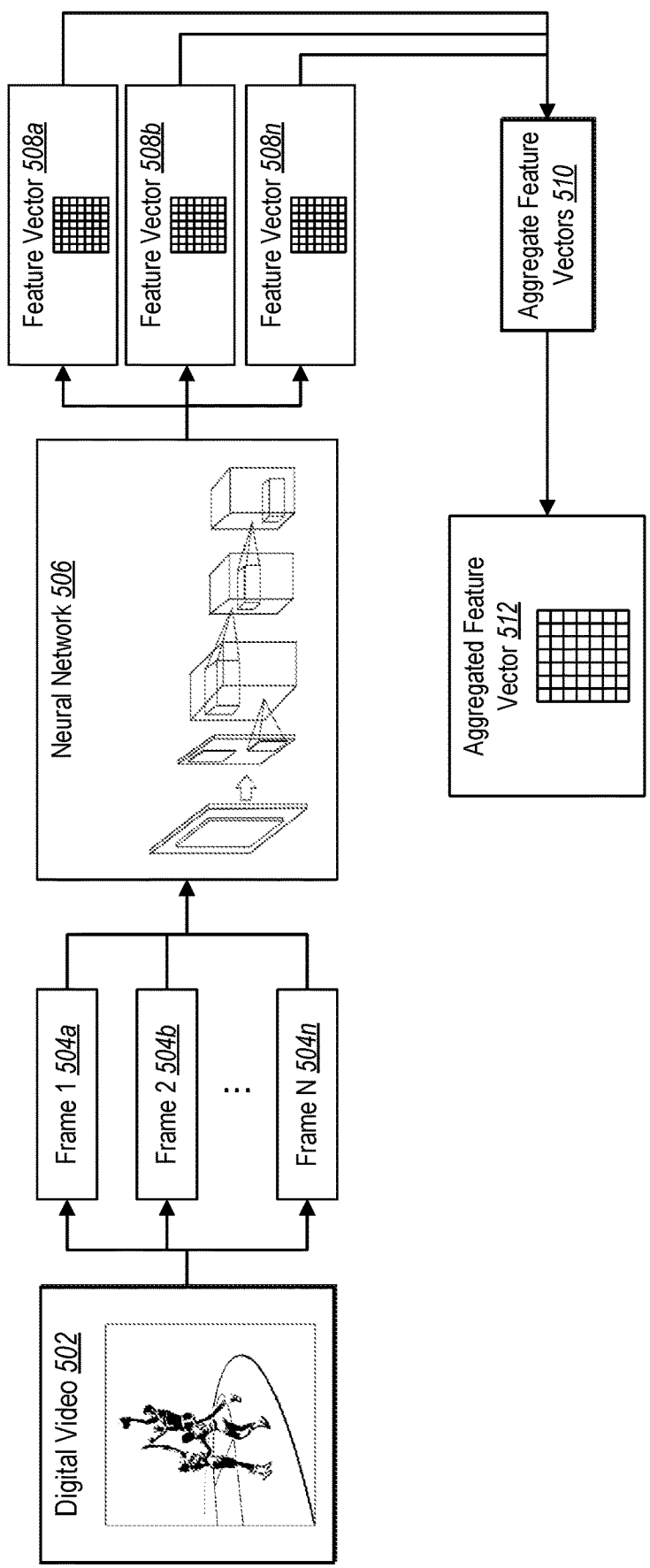
FIG. 5A illustrates a process of generating an aggregated feature vector for a digital video in accordance with one or more embodiments.
Figure 5B:
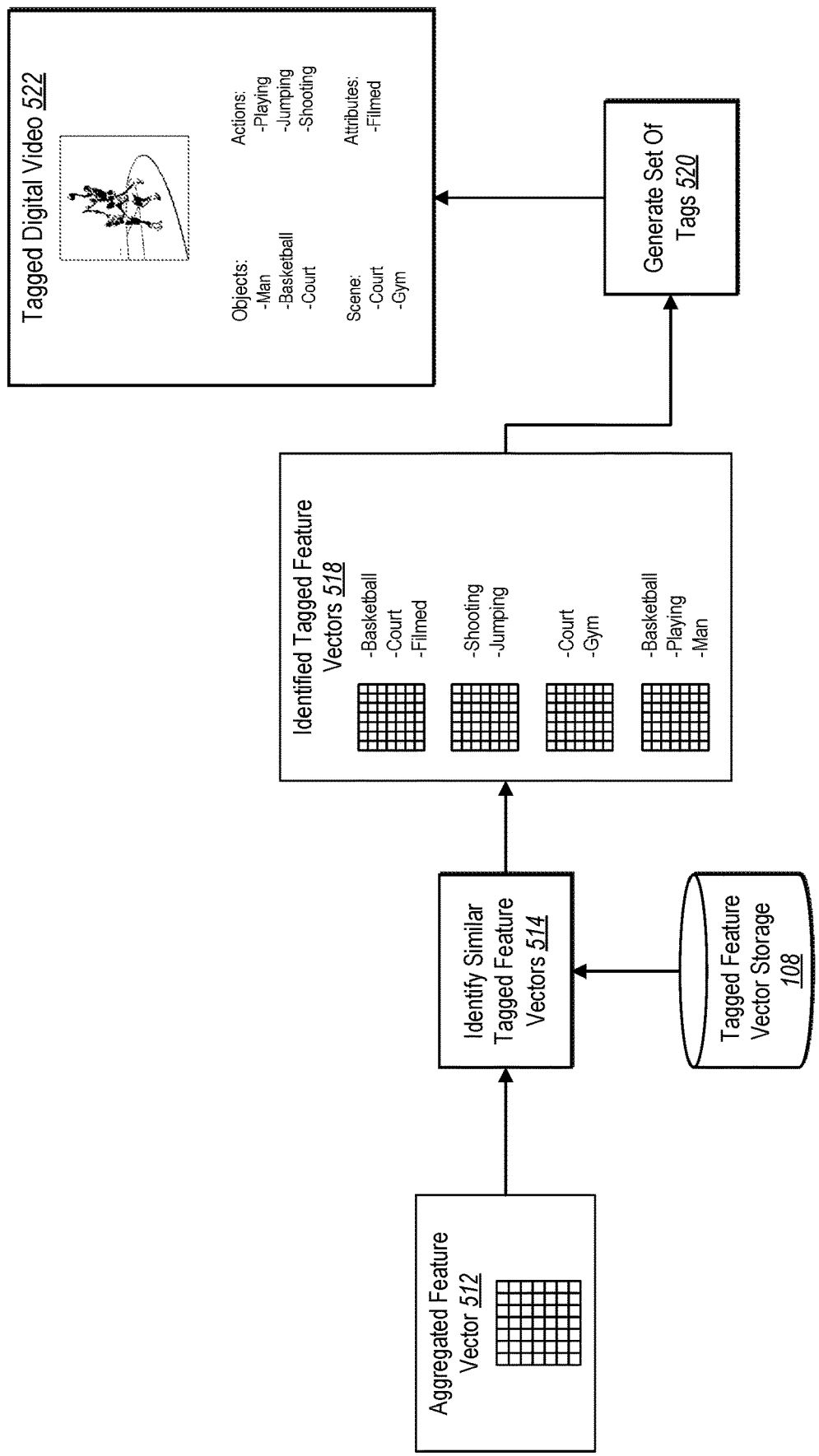
FIG. 5B illustrates a process of utilizing an aggregated feature vector from a digital video to tag the digital video in accordance with one or more embodiments.

As mentioned above, the digital video tagging system 106 can generate tags for an input digital video utilizing the tagged feature vectors. For example, FIGS. 5A-5B illustrate an implementation in which the digital video tagging system 106 generates an aggregated feature vector from an input digital video and utilizes the aggregated feature vector to generate a set of tags for the input digital video. For example, the digital video tagging system 106 can extract frames from an input digital video, generate feature vectors from the frames, and combine the feature vectors to generate an aggregated feature vector (e.g., aggregate across generated feature vectors). Furthermore, the digital video tagging system 106 can utilize the aggregated feature vector to identify similar tagged feature vectors and generate a set of tags, for the input digital video, from the identified tagged feature vectors.

For example, the digital video tagging system 106 can receive a digital video 502 (e.g., an input digital video). In particular, the digital video tagging system 106 can receive the digital video from a variety of sources. For instance, the digital video tagging system 106 can receive the digital video from, but not limited to, a client device 112 and/or a collection of digital videos (e.g., an online video sharing source). Indeed, the digital video 502 can include user provided information, such as metadata information, and/or include no additional information. For instance, FIG. 5A illustrates the digital video tagging system 106 receiving a digital video 502 (e.g., a digital video portraying a basketball game).

Furthermore, upon receiving (or identifying) a digital video, the digital video tagging system 106 can extract one or more frames from the digital video. For instance, the digital video tagging system 106 can extract any number of frames from the digital video to utilize in generating a set of tags for the digital video. For example, the digital video tagging system 106 can extract all of the frames included in the digital video, can extract a number of frames based on time intervals, and/or can extract a number of frames based on other thresholds. For instance, FIG. 5A illustrates the digital video tagging system 106 extracting frames 504a-504n (e.g., Frame 1 504a, Frame 2 504b, and Frame N 504n) from the digital video 502.

As an example, the digital video tagging system 106 can extract frames based on time intervals by extracting a frame at each configured time increment (e.g., every second, every three seconds, or every ten seconds). Furthermore, the digital video tagging system 106 can utilize other thresholds such as, but not limited to, a threshold number of frames. For example, the digital video tagging system 106 can extract each frame at an interval that will result in the threshold number of frames (e.g., if the threshold number of frames is one hundred, the digital video tagging system 106 can divide the total number of frames of a digital video by one hundred to get the number of increments and extract a frame at each of those increments). In some embodiments, the digital video tagging system 106 can automatically adjust the number of frames extracted from a digital video based on attributes of the digital video (e.g., the length of the digital video). For instance, the digital video tagging system 106 can increase and/or decrease the time intervals and/or the threshold number of frames based on the length of the digital video.

Additionally, in one or more embodiments, the digital video tagging system 106 utilizes a neural network to generate one or more feature vectors from one or more frames of a digital video. For instance, the digital video tagging system 106 can utilize an image classification neural network to generate feature vectors from frames of a digital video. In some embodiments, the digital video tagging system 106 utilizes a convolutional neural network (CNN) to generate feature vectors from the frames. Indeed, the digital video tagging system 106 can utilize the same neural network utilized to generate the feature vectors from the training digital images (e.g., the neural network utilized to generate the feature vectors for the tagged feature vectors in FIG. 4) to generate feature vectors from frames of an input digital image. Furthermore, the neural network is trained to extract and/or generate feature vectors digital video frames.

In some embodiments, the digital video tagging system 106 utilizes a neural network to generate a feature vector for a frame by extracting features (e.g., visual characteristics and/or latent attributes) in different levels of abstractions. Indeed, the neural network, such as a CNN, can generate feature vectors for a frame by learning features and/or generating feature vectors for the features by utilizing neural network layers such as, but not limited to, one or more convolution layers, one or more activation layers (e.g., ReLU layers), one or more pooling layers, and/or one or more fully connected layers. Furthermore, although the disclosure herein describes the digital video tagging system 106 generating a feature vector for each digital video frame, the digital video tagging system 106 can utilize a neural network to generate multiple feature vectors from each digital video frame (e.g., multiple feature vectors for various features learned from a digital video frame). Moreover, the digital video tagging system 106 can utilize a neural network for feature ablation when generating feature vectors from digital video frames.

Additionally, in addition to generating feature vectors from the digital video frames, the digital video tagging system 106 can associate other information with the feature vectors. Indeed, the digital video tagging system 106 can associate information with the generated feature vectors to provide an identity for the feature vectors. For instance, the digital video tagging system 106 can associate information such as, but not limited to, a digital frame identifier (e.g., a pointer that identifies which digital video frame the feature vector corresponds with), a digital video identifier (e.g., a pointer that identifies which digital video the feature vector corresponds with), and/or a time identifier (e.g., a time value that indicates at which time stamp from the digital video the feature vector corresponds with).

For instance, the embodiment of FIG. 5A illustrates the digital video tagging system 106 utilizing a neural network to generate feature vectors. In particular, as shown in FIG. 5A, the digital video tagging system 106 provides the frames 504a-504n (or digital video frames) to a neural network 506 to generate the feature vectors 508a-508n (e.g., feature vectors 508a-508n correspond to the frames 504a-504n). Furthermore, the digital video tagging system 106 can associate other information with the feature vectors 508a-508n, as described above.

In addition, as mentioned above, the digital video tagging system 106 can generate an aggregated feature vector from feature vectors of a digital video. In particular, the digital video tagging system 106 can combine feature vectors corresponding to a digital video to generate an aggregated feature vector. For instance, the aggregated feature vector can be a holistic representation of multiple feature vectors. For example, the aggregated feature vector can represent features of multiple frames to characterize visual features that occur over multiple frames (e.g., characterize visual features such as actions that are portrayed over multiple frames).

Indeed, the digital video tagging system 106 can utilize a variety of methods to combine feature vectors corresponding to a digital video to generate an aggregated feature vector. In one or more embodiments, the digital video tagging system 106 utilizes max pooling to combine feature vectors corresponding to a digital video (or digital video frames). In particular, the digital video tagging system 106 can utilize max pooling to generate a feature vector (e.g., the aggregated feature vector) by utilizing a max value from each data point (or each feature dimension) of each feature vector corresponding to the digital video as a final data point of the aggregated feature vector. Indeed, the digital video tagging system 106 can align the feature vectors from the digital video to take a max value of each similar data point from amongst the generated feature vectors (e.g., a data point that is representative of the same type of feature) to generate the aggregated feature vector.

Furthermore, the digital video tagging system 106 can also utilize a variety of other methods to combine the feature vectors corresponding to the digital video frames to generate an aggregated feature vector. For instance, in some embodiments, the digital video tagging system 106 utilizes averaging to combine the feature vectors corresponding to the digital video frames to generate the aggregated feature vector. Additionally, the digital video tagging system 106 can utilize other methods such as, but not limited to, attentive pooling, soft max pooling, weighted averaging, and/or normalization (e.g., $L^2$-norm) to combine the feature vectors corresponding to the digital video frames to generate the aggregated feature vector.

As an example, FIG. 5A illustrates the digital video tagging system 106 generating an aggregated feature vector from feature vectors corresponding to a digital video. For instance, as shown in FIG. 5A, the digital video tagging system 106 utilizes feature vectors 508a-508n to aggregate the feature vectors in act 510 to generate the aggregated feature vector 512. Indeed, the digital video tagging system 106 can utilize any, or any combination of, methods described above to aggregate the feature vectors in act 510. Additionally, the digital video tagging system 106 can associate an aggregated feature vector (e.g., the aggregated feature vector 512) with a digital video (e.g., digital video 502), digital video frames corresponding to the digital video (e.g., frames 504a-504n), and/or feature vectors corresponding to the digital video (e.g., feature vectors 508a-508n). Moreover, although FIG. 5A illustrates the digital video tagging system 106 generating a single aggregated feature vector, the digital video tagging system 106 can generate multiple aggregated feature vectors for the digital video, digital video frames, and/or the feature vectors.

As mentioned above, the digital video tagging system 106 can utilize an aggregated feature vector corresponding to a digital video to generate a set of tags for the digital video. For instance, the embodiment in FIG. 5B illustrates the digital video tagging system 106 utilizing an aggregated feature vector corresponding to a digital video (e.g., the aggregated feature vector 512 from FIG. 5A) to generate a set of tags for the digital video (e.g., the digital video 502 from FIG. 5A). In particular, the digital video tagging system 106 can analyze an aggregated feature vector and tagged feature vectors from the tagged feature vector storage 108 to identify similar tagged feature vectors (e.g., similar to the aggregated feature vector) to generate the set of tags for the digital video.

For instance, the digital video tagging system 106 can analyze an aggregated feature vector and tagged feature vectors from the tagged feature vector storage 108 (e.g., a hash table of tagged feature vectors) to identify similar tagged feature vectors. More specifically, the digital video tagging system 106 can compare the aggregated feature vector to each of the tagged feature vectors from the tagged feature vector storage 108 to identify similar tagged feature vectors. For instance, the digital video tagging system 106 determines distance values between the aggregated feature vector and each of the tagged feature vectors to identify similar tagged feature vectors.

In one or more embodiments, the digital video tagging system 106 utilizes a variety of methods to compare the aggregated feature vectors to each of the tagged feature vectors to identify the similar tagged feature vectors. For example, the digital video tagging system 106 can utilize methods (or algorithms) such as, but not limited to, k-nearest neighbor calculations, cosine similarity calculations, clustering techniques, and/or embedding spaces to compare the aggregated feature vectors to each of the tagged feature vectors to identify the similar tagged feature vectors. For instance, the digital video tagging system 106 can utilize an k-nearest neighbor algorithm to determine distance values (e.g., a Euclidean distance) between the aggregated feature vector and each of the tagged feature vectors within a space (e.g., a Euclidean space). Then, the digital video tagging system 106 can utilize a "k" number of tagged feature vectors (e.g., a number selected and/or configured by a neural network, user of the digital video tagging system 106, and/or the digital video tagging system 106) based on the determined distance values. Indeed, the digital video tagging system 106 can determine which tagged feature vectors are similar to the aggregated feature vector based on the distance value (e.g., a shorter distance value can indicate a stronger similarity between the feature vectors). In particular, the digital video tagging system 106 can utilize a threshold distance value to select the tagged feature vectors (e.g., select the tagged feature vectors that have a distance value that meets a threshold distance value, set by a server administrator, the digital video tagging system 106, and/or a machine learning model, as the similar tagged feature vectors).

Additionally, the digital video tagging system 106 can also utilize cosine similarity to identify the similar tagged feature vectors. In one or more embodiments, the digital video tagging system 106 determines a cosine similarity measurement as a distance value between the aggregated feature vector and each of the tagged feature vectors. For instance, the digital video tagging system 106 can determine an angle between the aggregated feature vector and a tagged feature vector on a vector space and utilize the angle (or a normalized value of the angle) as a distance value between the aggregated feature vector and the tagged feature vector. Indeed, the digital video tagging system 106 can determine such an angle between the aggregated feature vector and each of the tagged feature vectors. Then, the digital video tagging system 106 can utilize these distance values (e.g., the cosine similarity measurements) to identify tagged feature vectors that are similar to the aggregated feature vector (e.g., a lesser angle measurement can indicate a stronger similarity between the feature vectors).

In addition to identifying similar tagged feature vectors to the aggregated feature vector based on one or more methods described above, the digital video tagging system 106 can also determine a degree of similarity between the similar tagged feature vectors and the aggregated feature vector. For instance, the digital video tagging system 106 can associate use the distance value between a tagged feature vector and an aggregated feature vector (e.g., the distance value from a tagged feature vector and an aggregated feature vector determined by one or more methods described above) as the degree of similarity between the tagged feature vector and the aggregated feature vector. Indeed, the digital video tagging system 106 can utilize this degree of similarity between each tagged feature vector and the aggregated feature vector to select a number of tagged feature vectors to utilize as identified tagged feature vectors (e.g., select the top threshold number of tagged feature vectors based on the nearest distance values). In particular, the digital video tagging system 106 uses the degree of similarity between an aggregated feature vector and one or more tagged feature vectors to determine a confidence score indicating how confident the digital video tagging system 106 is that a tag should be associated with a given video frame or set of frames. In one or more embodiments, the digital video tagging system 106 normalizes the distance values to a scale between 0 and 1 or 1 and 100 to determine confidences scores. The digital video tagging system 106 can then identify tagged feature vectors with confidence scores above a threshold score (e.g., 0.6 or 60) as similar tagged feature vectors.

As illustrated in the embodiment of FIG. 5B, the identified tagged feature vectors 518 include feature vectors tagged with tags such as "basketball," "court," "shooting," "jumping," "court," "gym," "basketball," and "playing." Additionally, although the embodiment of FIG. 5B illustrates a specific number of tagged feature vectors in the identified tagged feature vectors 518, the digital video tagging system 106 can identify and utilize any number of tagged feature vectors to generate a set of tags for a digital video. Furthermore, the digital video tagging system 106 can associate any information available, as described above, for the tagged feature vectors (e.g., relevance scores for tags, embedding spaces, digital video timestamps) from the tagged feature vector storage 108 with the identified tagged feature vectors.

Additionally, the digital video tagging system 106 can utilize the identified similar tagged feature vectors to generate a set of tags for a digital video. For instance, the digital video tagging system 106 can utilize the tags associated with tagged feature vectors (e.g., identified similar tagged feature vectors) to generate the set of tags for the digital video. Indeed, the digital video tagging system 106 can utilize a variety of methods to generate a set of tags from a tagged feature vector for a digital video.

For example, in one or more embodiments, the digital video tagging system 106 aggregates tags associated with tagged feature vectors and associates those tags to a digital video (e.g., the digital video corresponding to the identified similar tagged feature vectors). In particular, the digital video tagging system 106 can identify each tag associated with the tagged feature vectors (e.g., the similar tagged feature vectors) and generate a set of tags from those tags for the digital video (and/or propagate those tags to the digital video). Furthermore, in one or more embodiments, the digital video tagging system 106 selects and aggregates tags from the tagged feature vectors, to generate the set of tags, based on relevance (or confidence) scores associated with the tags from the tagged feature vectors. For instance, in some embodiments, the digital video tagging system 106 utilizes (or selects) a threshold number of tags from each similar tagged feature vector based on a relevance score associated with the tags, as described above in FIG. 4, to generate a set of tags for the digital video. For example, the digital video tagging system 106 can select the top threshold number of tags (e.g., the top five tags) from each tagged feature vector based on the relevance score associated with each tag associated with each tagged feature vector.

Furthermore, in some embodiments, the digital video tagging system 106 can adjust the relevance scores associated with each tag based on a weight prior to selecting tags for the generated set of tags. In particular, the digital video tagging system 106 can utilize a weight that is based on similarities between the aggregated feature vector and a tagged feature vector prior to selecting tags from the tagged feature vector (e.g., based on the quantification of similarity such as a distance value). Furthermore, the digital video tagging system 106 can utilize a weight that is based on other calculations such as, but not limited to, bigram reweighting.

Upon generating the set of tags from tagged feature vectors that are similar to an aggregated feature vector corresponding to a digital video, the digital video tagging system 106 can associate the set of tags with the digital video. Indeed, the digital video tagging system 106 can associate the generated set of tags, with any other corresponding information such as confidence scores for the tags, to the entire digital video. In some embodiments, the digital video tagging system 106 associates tags from the generated set of tags to one or more segments of the digital video as described in greater detail in below figures.

As an example, the embodiment of FIG. 5B illustrates the digital video tagging system 106 associating a generated set of tags with a digital video. For instance, as shown in FIG. 5B, the digital video tagging system 106 generates a set of tags in act 520 from the identified tagged feature vectors 518. Furthermore, as illustrated in the embodiment of FIG. 5B, the digital video tagging system 106 associates the set of tags from act 520 to the digital video 502 to generate a tagged digital video 522. Indeed, as shown in the embodiment of FIG. 5B, the tagged digital video 522 includes object tags "man," "basketball," and "court," action tags "playing," "jumping," and "shooting," scene tags "court" and "gym," and an attribute tag of "filmed."

Figure 6A:
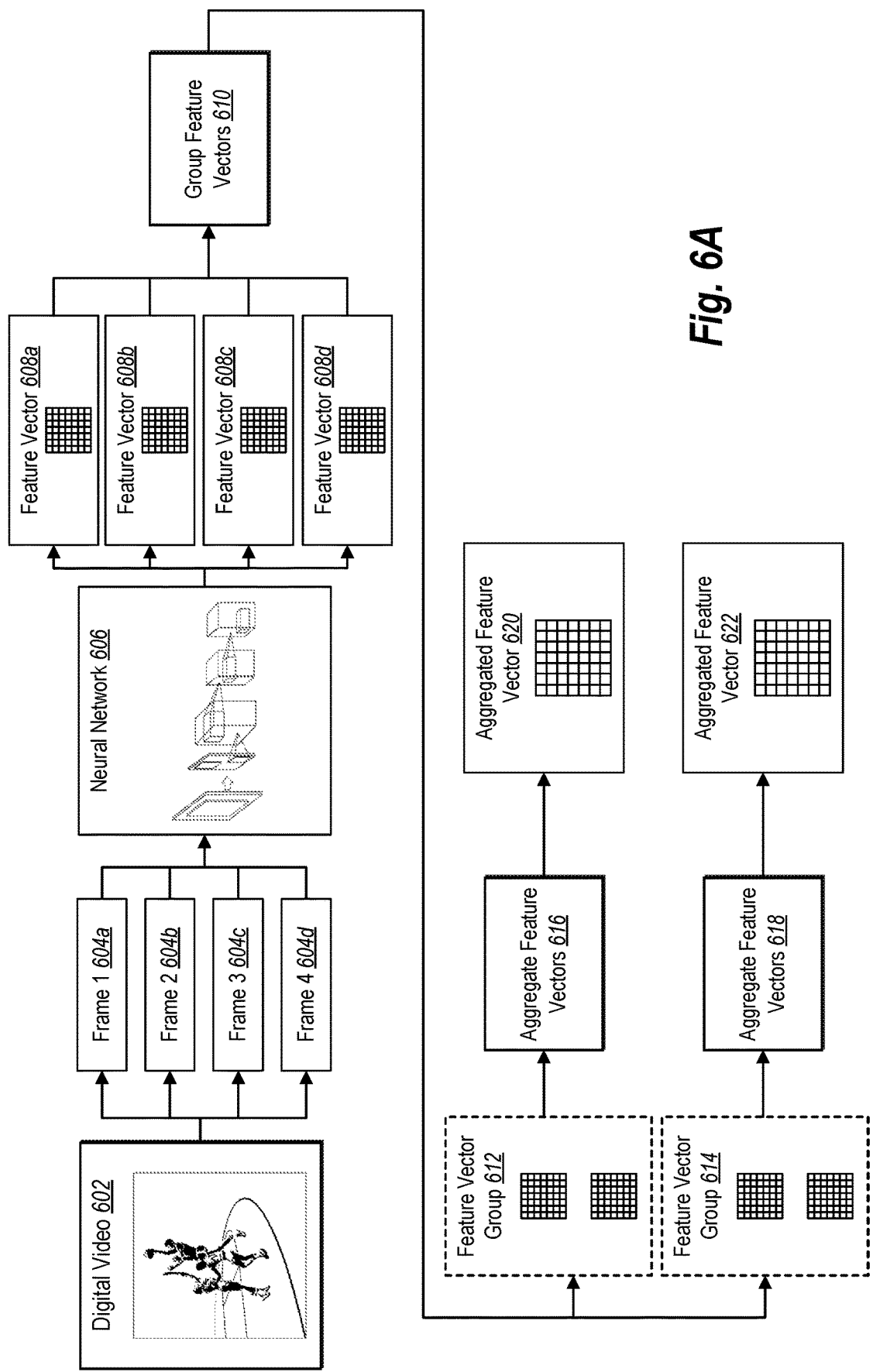
FIG. 6A illustrates a process of generating multiple aggregated feature vectors for a digital video in accordance with one or more embodiments.
Figure 6B:
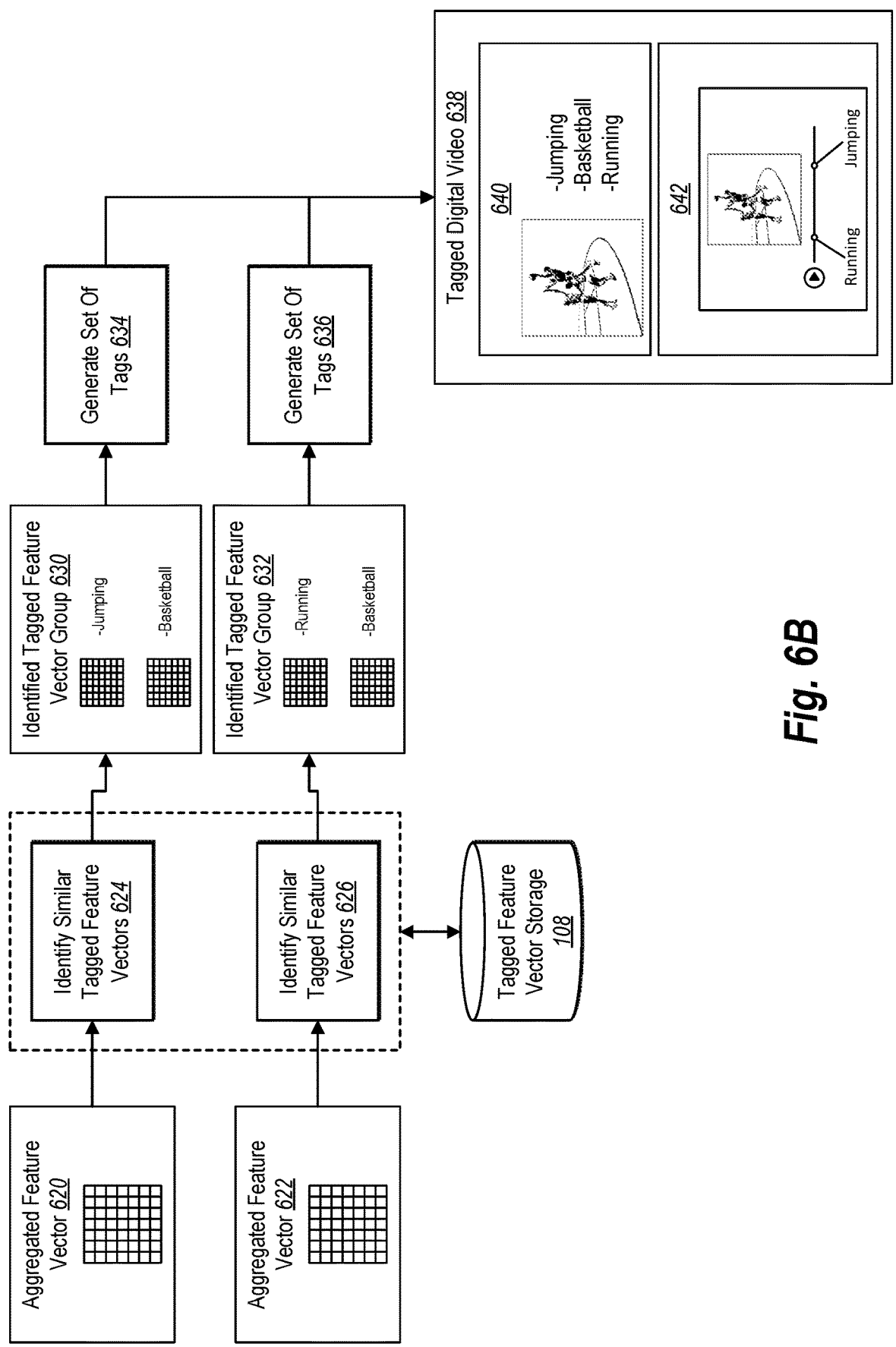
FIG. 6B illustrates a process of utilizing multiple aggregated feature vectors from a digital video to tag the digital video in accordance with one or more embodiments.

As mentioned above, the digital video tagging system 106 can utilize multiple aggregated feature vectors, from groups of feature vectors corresponding to a digital video, to generate a set of tags for the digital video. In particular, the digital video tagging system 106 can generate feature vectors for frames of a digital video, group the feature vectors based on similarity and/or chronological order of the frames, and generate an aggregated feature vector for each group of feature vectors. Then, the digital video tagging system 106 can identify similar tagged feature vectors for each aggregated feature vector and utilize the tagged feature vectors to generate a set of tags. Indeed, the digital video tagging system 106 can utilize multiple aggregated feature vectors such that the aggregated feature vectors more accurately represent a characteristic and/or attribute from a digital video (e.g., an action). Furthermore, by utilizing multiple aggregated feature vectors, the digital video tagging system 106 is capable of delineating scenes and/or acts portrayed in a digital video to generate an accurate set of tags for each of those scenes or temporal segment of the digital video. For instance, FIGS. 6A-6B illustrate the digital video tagging system 106 utilizing multiple aggregated feature vectors, from groups of feature vectors corresponding to a digital video, to generate a set of tags for temporal segments of the digital video.

For example, as just mentioned, the digital video tagging system 106 can extract frames from a digital video and generate feature vectors for the frames utilizing a neural network. Indeed, the digital video tagging system 106 can extract frames from the digital video and generate feature vectors for the frames as described above in FIGS. 5A-5B. As an example, the embodiment of FIG. 6A illustrates the digital video tagging system 106 extracting a set of frames from a digital video and generating feature vectors from the set of frames. In particular, the embodiment of FIG. 6A illustrates the digital video tagging system 106 extracting a set of frames 604*a*-604*d* (e.g., Frame 1 604*a*, Frame 2 604*b*, Frame 3 604*c*, and Frame 4 604*d*) from a digital video 602 (e.g., the digital video 602 portraying a basketball game). Furthermore, as shown in the embodiment of FIG. 6A, the digital video tagging system 106 utilizes a neural network 606 to generate the feature vectors 608*a*, 608*b*, 608*c*, and 608*d* (e.g., the feature vectors 608*a*-608*d* correspond with the set of frames 604*a*-604*d*). Although, the embodiment of FIG. 6A illustrates the digital video tagging system 106 extracting four frames from a digital video and generating four feature vectors from the frames, the digital video tagging system 106 can extract any number of frames from a digital video and/or can generate any number of feature vectors for each of the frames.

Upon generating feature vectors for a digital video, the digital video tagging system 106 can group the feature vectors into one or more groups. In particular, the digital video tagging system 106 can group feature vectors based on similarities between the feature vectors and/or chronological order of the frames. For instance, the digital video tagging system 106 can group feature vectors based on distance values between the feature vectors. For example, the digital video tagging system 106 can group similar feature vectors corresponding to frames that have similar times stamps. Indeed, the digital video tagging system 106 can utilize one or more methods to measure and/or determine similarities between the generated feature vectors, as described above in FIGS. 5A-5B (e.g., utilize a k-nearest neighbor algorithm and/or a cosine similarity algorithm to determine distance values between the feature vectors). Then, the digital video tagging system 106 utilize the determined similarities (e.g., distance values) to group the feature vectors into one or more groups (or clusters). For instance, such groups of feature vectors can identify feature vectors that are similar and/or generally portray a similar act and/or instance within a digital video.

In some embodiments, the digital video tagging system 106 can further base the groupings of feature vectors on time values. In particular, the digital video tagging system 106 can group the feature vectors, that are determined to be similar, together when they correspond to frames that are close in time (e.g., a determined threshold time range) and/or chronological in the digital video. Furthermore, in one or more embodiments, the digital video tagging system 106 can group the feature vectors regardless of whether they are close in time and/or are chronological in the digital video. Furthermore, in some embodiments, the digital video tagging system 106 can group one or more frames of the digital video prior to generating feature vectors and utilize the group of frames to generate feature vectors and/or aggregated feature vectors.

As an example, FIG. 6A illustrates the digital video tagging system 106 grouping feature vectors based on similarities prior to generating aggregated feature vectors. For instance, as shown in the embodiment of FIG. 6A, the digital video tagging system 106 groups the feature vectors in act 610 by determining similarities between the feature vectors 608*a*-608*d* to create feature vector group 612 and feature vector group 614. In one or more embodiments, the digital video tagging system 106 associates other information with the feature vector groups such as information corresponding to each feature vector in that group (e.g., information as described in FIGS. 4 and 5A-5B).

Furthermore, the digital video tagging system 106 can combine feature vectors from each group to generate an aggregated feature vector for each feature vector group.

Indeed, the digital video tagging system 106 can utilize one or more methods described in FIGS. 5A-5B to generate an aggregated feature vector for each feature vector group based on feature vectors within the groups. Additionally, the digital video tagging system 106 can also associate information corresponding to the feature vectors utilized to generate the aggregated feature vectors with the aggregated feature vectors as described above in FIGS. 4 and 5A-5B.

For instance, FIG. 6A illustrates an example of the digital video tagging system 106 generating aggregated feature vectors based on feature vectors from feature vector groups. In particular, as shown in the embodiment of FIG. 6A, the digital video tagging system 106 aggregates feature vectors in act 616 by combining feature vectors from feature vector group 612 to generate the aggregated feature vector 620. Furthermore, as illustrated in FIG. 6A, the digital video tagging system 106 can aggregate feature vectors in act 618 by combining feature vectors from feature vector group 614 to generate the aggregated feature vector 622.

Upon generating an aggregated feature vector for each feature vector group corresponding to a digital video, the digital video tagging system 106 can utilize the aggregated feature vectors to generate a set of tags for the digital video. For example, the embodiment of FIG. 6B illustrates the digital video tagging system 106 utilizing multiple aggregated feature vectors (e.g., the aggregated feature vector 620 and the aggregated feature vector 622 from FIG. 6A generated from feature vector groups) to generate a set of tags for a digital video (e.g., the digital video 602). In particular, the digital video tagging system 106 can analyze each aggregated feature vector, generated from feature vector groups of a digital video, with tagged feature vectors from the tagged feature vector storage 108 to identify similar tagged feature vectors for each of the aggregated feature vectors. Then, the digital video tagging system 106 can utilize the tagged feature vectors to generate a set of tags for the digital video.

For instance, the digital video tagging system 106 can identify similar tagged feature vectors, from the tagged feature vector storage 108, for each aggregated feature vector based on a comparison between each of the aggregated feature vectors and the tagged feature vectors from the tagged feature vector storage 108. Indeed, the digital video tagging system 106 can identify the tagged feature vectors based on each of the aggregated feature vectors utilizing methods as described in FIGS. 5A-5B. Furthermore, the digital video tagging system 106 can create separate groups of tagged feature vectors corresponding to each of the aggregated feature vectors that correspond to separate feature vector groups from the digital video.

Additionally, the digital video tagging system 106 can utilize tagged feature vectors (or groups of tagged feature vectors) to generate one or more sets of tags for a digital video. For example, the digital video tagging system 106 can utilize methods described in FIGS. 5A-5B to identify tags from the tagged feature vectors and generate one or more sets of tags for each group of tagged feature vectors (e.g., each group of tagged feature vectors corresponding to a feature vector group generated for a digital video). Furthermore, in some embodiments, the digital video tagging system 106 associates (or propagates) the generated set of tags to the digital video as described in the above figures.

In addition, the digital video tagging system 106 can associate tags from one or more generated set of tags with segments of a digital video. For instance, the digital video tagging system 106 can associate tags with segments of a digital video based on each tag's corresponding feature vector groups and/or aggregated feature vectors information (e.g., information associated with the tags as described in FIGS. 4 and 5A-5B). For instance, the digital video tagging system 106 can determine timestamp information (e.g., a timestamp corresponding to a segment of a digital video) associated with the frames, feature vectors, feature vector groups, and/or aggregated feature vectors corresponding to each tag. Then, the digital video tagging system 106 can utilize the timestamp information for each tag to associate the tag with the segment of the digital video associated with the timestamp information. Indeed, the digital video tagging system 106 can determine timestamp information for each tag in a generated set of tags and associate each tag with one or more segments of a digital video.

As an example, FIG. 6B illustrates the digital video tagging system 106 identifying groups of similar tagged feature vectors from multiple aggregated feature vectors and generating tags for a digital video from the identified groups of tagged feature vectors. In particular, the digital video tagging system 106 can utilize the aggregated feature vector 620 (e.g., the aggregated feature vector generated in FIG. 6A) to identify similar tagged feature vectors in act 624 (from tagged feature vector storage 108) and to create an identified tagged feature vector group 630. Furthermore, the digital video tagging system 106 can utilize the aggregated feature vector 622 (e.g., the aggregated feature vector generated in FIG. 6B) to identify similar tagged feature vectors in act 626 (from tagged feature vector storage 108) and to create an identified tagged feature vector group 632. Then, the digital video tagging system 106 can then generate a set of tags in act 634 from the identified tagged feature vector group 630 and can generate a set of tags in act 636 from the identified tagged feature vector group 632 to generate the tagged digital video 638 (e.g., a tagged version of the digital video 602).

Additionally, as shown in FIG. 6B, the digital video tagging system 106 can associate tags with the tagged digital video 638 (e.g., tagged digital video 640 includes tags "jumping," "basketball," and "running"). Moreover, as illustrated in FIG. 6B, the digital video tagging system 106 can associate tags with segments of the tagged digital video 638 (e.g., tagged digital video 642 includes a tag "running" at one segment and a tag "jumping" at another segment of the tagged digital video 642). In addition, although FIG. 6B illustrates the digital video tagging system 106 utilizing two aggregated feature vectors, the digital video tagging system 106 can utilize any number of aggregated feature vectors to generate a set of tags for a digital video.

Acts and/or elements 502-522 from FIGS. 5A-5B, acts and/or elements 602-642 from FIGS. 6A-6B, and/or the algorithms presented above in relation to acts and/or elements from FIGS. 5A, 5B, 6A, and 6B can comprise the corresponding structure for performing a step for generating an aggregated feature vector from the feature vectors.

Figure 7:
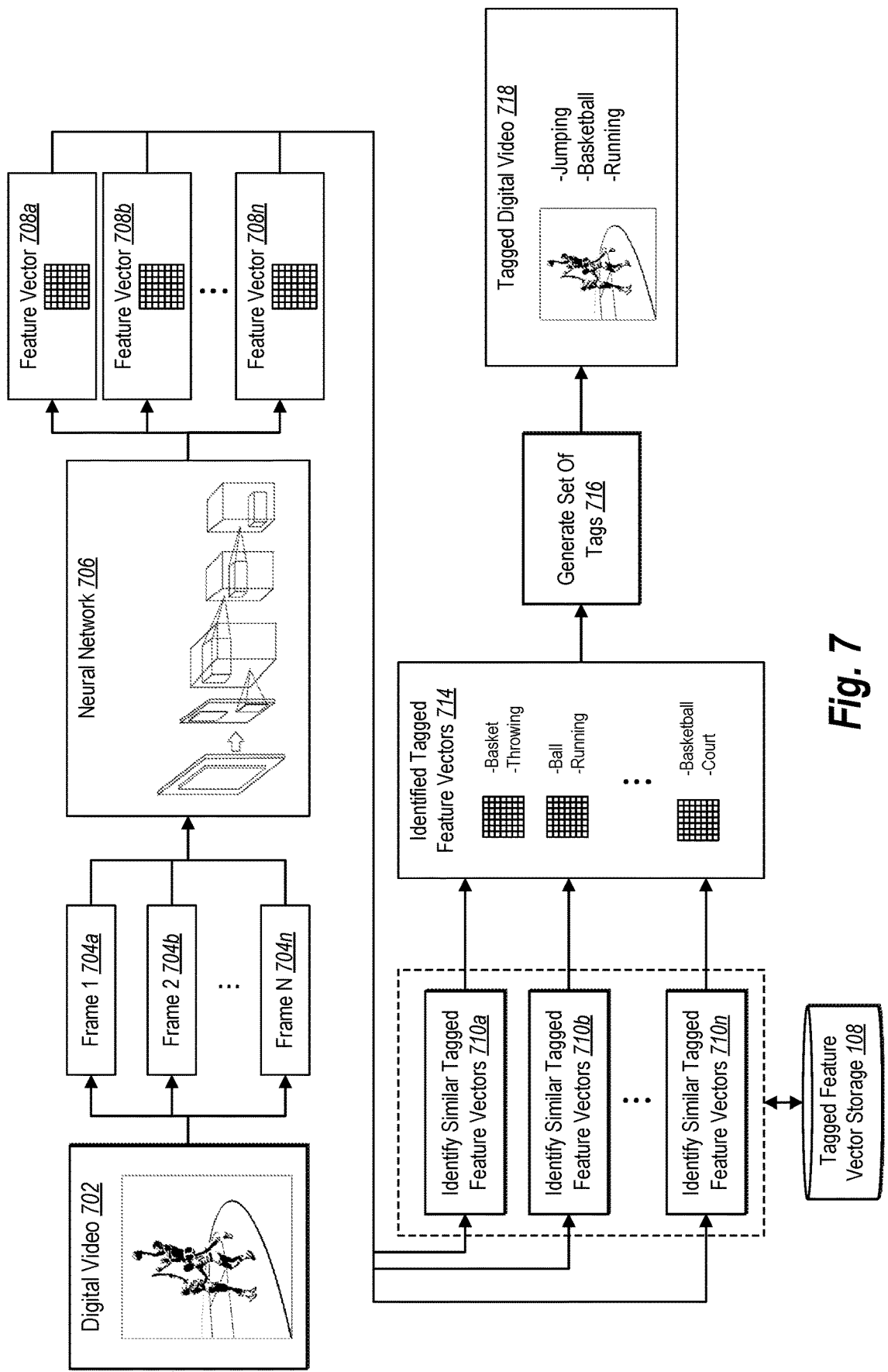
FIG. 7 illustrates a process of utilizing feature vectors for frames of a digital video to tag the digital video in accordance with one or more embodiments.

As mentioned above, the digital video tagging system 106 can also generate a set of tags for a digital video by identifying similar tagged feature vectors based on feature vectors from individual frames of the digital video. For instance, FIG. 7 illustrates the digital video tagging system 106 generating a set of tags for a digital video based on feature vectors from individual frames of the digital video. In particular, the digital video tagging system 106 can extract a set of frames and generate feature vectors for set of frames of a digital video utilizing methods described in the figures above. Then, for each generated feature vector from the set of frames, the digital video tagging system 106 can identify similar tagged feature vectors (utilizing methods described above). Furthermore, the digital video tagging system 106 can identify tags from those tagged feature vectors to generate a set of tags for the digital video in accordance with one or more embodiments described above.

As an example, FIG. 7 illustrates the digital video tagging system 106 generating a set of tags for a digital video by identifying similar tagged feature vectors based on feature vectors from individual frames of the digital video. For instance, as shown in FIG. 7, the digital video tagging system 106 can extract a set of frames 704a-704n (e.g., Frame 1 704a, Frame 2 704b, and through Frame N 704n) from a digital video 702. Additionally, the digital video tagging system 106 utilizes a neural network 706 with the set of frames 704a-704n to generate feature vectors 708a, 708b, and through 708n (e.g., the feature vectors 708a-708n correspond with the set of frames 704a-704n). Then, as shown in the embodiment of FIG. 7, the digital video tagging system 106 utilizes tagged feature vector storage 108 to identify similar tagged feature vectors in acts 710a, 710b, and through 710n from the feature vectors 708a-708n to create identified tagged feature vectors 714. As shown in the embodiment of FIG. 7, the identified tagged feature vectors 714 include feature vectors with tags such as "basket," "throwing," "ball," "running," "basketball," and "court." Furthermore, as illustrated in the embodiment of FIG. 7, the digital video tagging system 106 utilizes the identified tagged feature vectors to generate a set of tags in act 716 to create the tagged digital video 718 (e.g., the digital video 702 with tags "jumping," "basketball," and "running."

Figure 8:
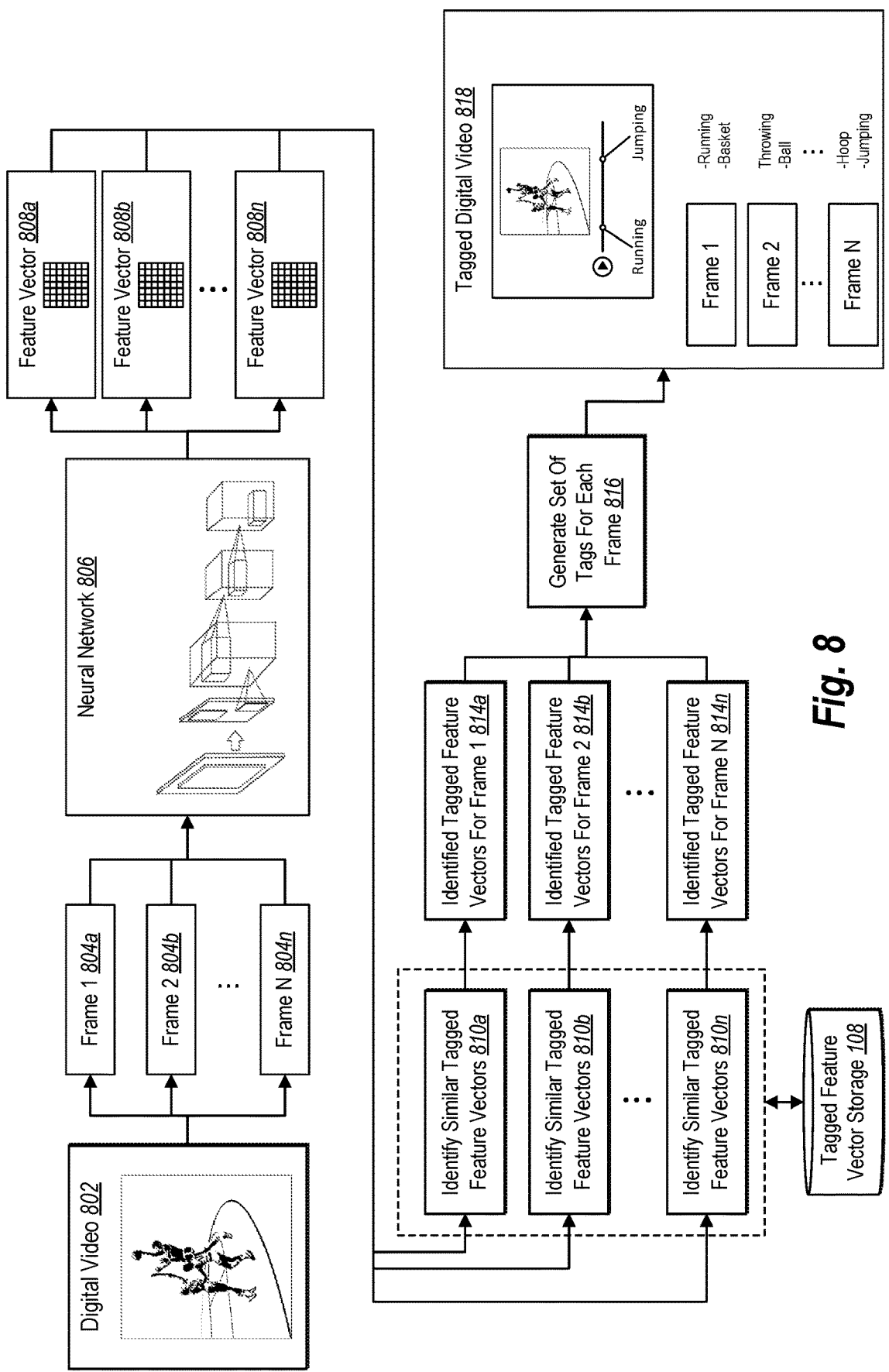
FIG. 8 illustrates a process of utilizing feature vectors for frames of a digital video to tag the frames of the digital video in accordance with one or more embodiments.

Additionally, as mentioned above, the digital video tagging system 106 can generate a set of tags for one or more frames of a digital video. In particular, the digital video tagging system 106 can generate a set of tags for one or more frames of a digital video by identifying similar tagged feature vectors from each feature vector generated from individual frames of a digital video. For instance, the embodiment of FIG. 8 illustrates the digital video tagging system 106 generating a set of tags for one or more frames of a digital video. For example, the digital video tagging system 106 can extract a set of frames and generate feature vectors for set of frames of a digital video utilizing methods described in the figures above. Then, for each generated feature vector from the set of frames, the digital video tagging system 106 can identify similar tagged feature vectors (utilizing methods described above). Furthermore, the digital video tagging system 106 can identify tags from those tagged feature vectors to generate (and/or to assign) a set of tags for each frame from the set of frames corresponding to the digital video in accordance with one or more embodiments described above.

As an example, the embodiment of FIG. 8 illustrates the digital video tagging system 106 generating a set of tags for one or more frames of a digital video. For instance, as shown in FIG. 8, the digital video tagging system 106 can extract a set of frames 804a-804n (e.g., Frame 1 804a, Frame 2 804b, and through Frame N 804n) from a digital video 802. Additionally, the digital video tagging system 106 can utilize a neural network 806 with the set of frames 804a-804n to generate feature vectors 808a, 808b, and through 808n (e.g., the feature vectors 808a-808n correspond with the set of frames 804a-804n). Then, as shown in FIG. 8, the digital video tagging system 106 can utilize tagged feature vector storage 108 to identify similar tagged feature vectors in acts 810a, 810b, and through 810n from the feature vectors 808a-808n to create identified tagged feature vectors for Frame 1 814a, identified tagged feature vectors for Frame 2 814b, and identified tagged feature vectors for Frame N 814n.

Furthermore, as illustrated in the embodiment of FIG. 8, the digital video tagging system 106 utilizes the identified tagged feature vectors for Frame 1 814a, identified tagged feature vectors for Frame 2 814b, and identified tagged feature vectors for Frame N 814n to generate a set of tags for each frame in act 816 to create the tagged digital video 818 (e.g., the digital video 802 with a tag "running" in one segment and a tag "jumping" in another segment of the tagged digital video 818). Furthermore, as shown in FIG. 8, the digital video tagging system 106 can associate tags with each frame in the tagged digital video 818 (e.g., Frame 1 includes the tags "running" and "basket," Frame 2 includes the tags "throwing" and "ball," and Frame N includes the tags "hoop" and "jumping").

Figure 9:
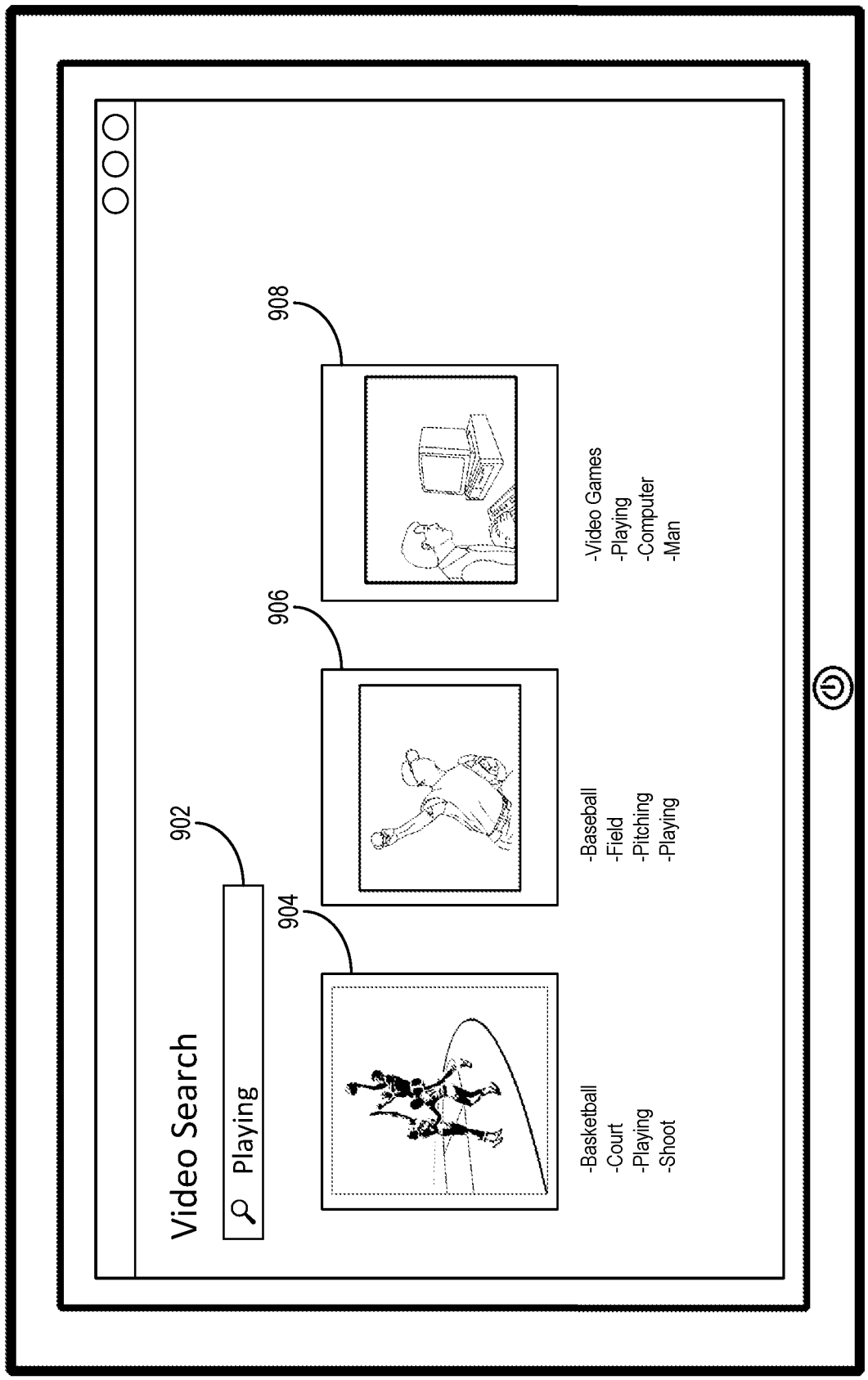
FIG. 9 illustrates the digital video tagging system utilizing tagged digital videos in an example search query in accordance with one or more embodiments.

Furthermore, as mentioned above, the digital video tagging system 106 can provide additional functionalities in association with tagged digital videos. For example, FIG. 9 illustrates the digital video tagging system 106 enabling searching capabilities for tagged digital videos. In particular, the digital video tagging system 106 can utilize tags associated with one or more digital videos to provide digital videos as search results in response to a search query. For instance, the digital video tagging system 106 can receive a search query, identify tags similar to the search query, and identify digital videos based on the identified tags.

As an example, FIG. 9 illustrates a user interface in which the digital video tagging system 106 enables searching for tagged digital videos based on generated tags. Specifically, as shown in FIG. 9, the digital video tagging system 106 receives a search query 902 (e.g., the term "playing"). Furthermore, the digital video tagging system 106 can utilize the search query 902 to identify tags such as the tag "playing." Then, the digital video tagging system 106 utilizes the identified tag of "playing" to identify a tagged digital video 904 (e.g., a digital video of a basketball game), tagged digital video 906 (e.g., a digital video of a baseball game), and tagged digital video 908 (e.g., a digital video of a person playing a video game). Indeed, the tagged digital videos 904-908 include the tag of "playing."

Moreover, the digital video tagging system 106 can provide other functionalities based on tagged digital videos such as organizational functionalities, tag recommendation functionalities, and reverse search for similar digital videos based on receiving a digital video as a search query. In particular, the digital video tagging system 106 can utilize one or more tags associated with tagged digital videos to organize the digital videos in a variety of categories. Additionally, the digital video tagging system 106 can provide tag recommendations to a user when a user uploads a digital video to a digital video sharing and/or hosting service by generating tags for the digital video (in accordance with one or more embodiments) during and/or after upload of the digital video. Furthermore, the digital video tagging system 106 can receive a digital video as a search query, generate tags for the digital video, and provide other tagged digital videos based on the generated tags as search results.

Figure 10:
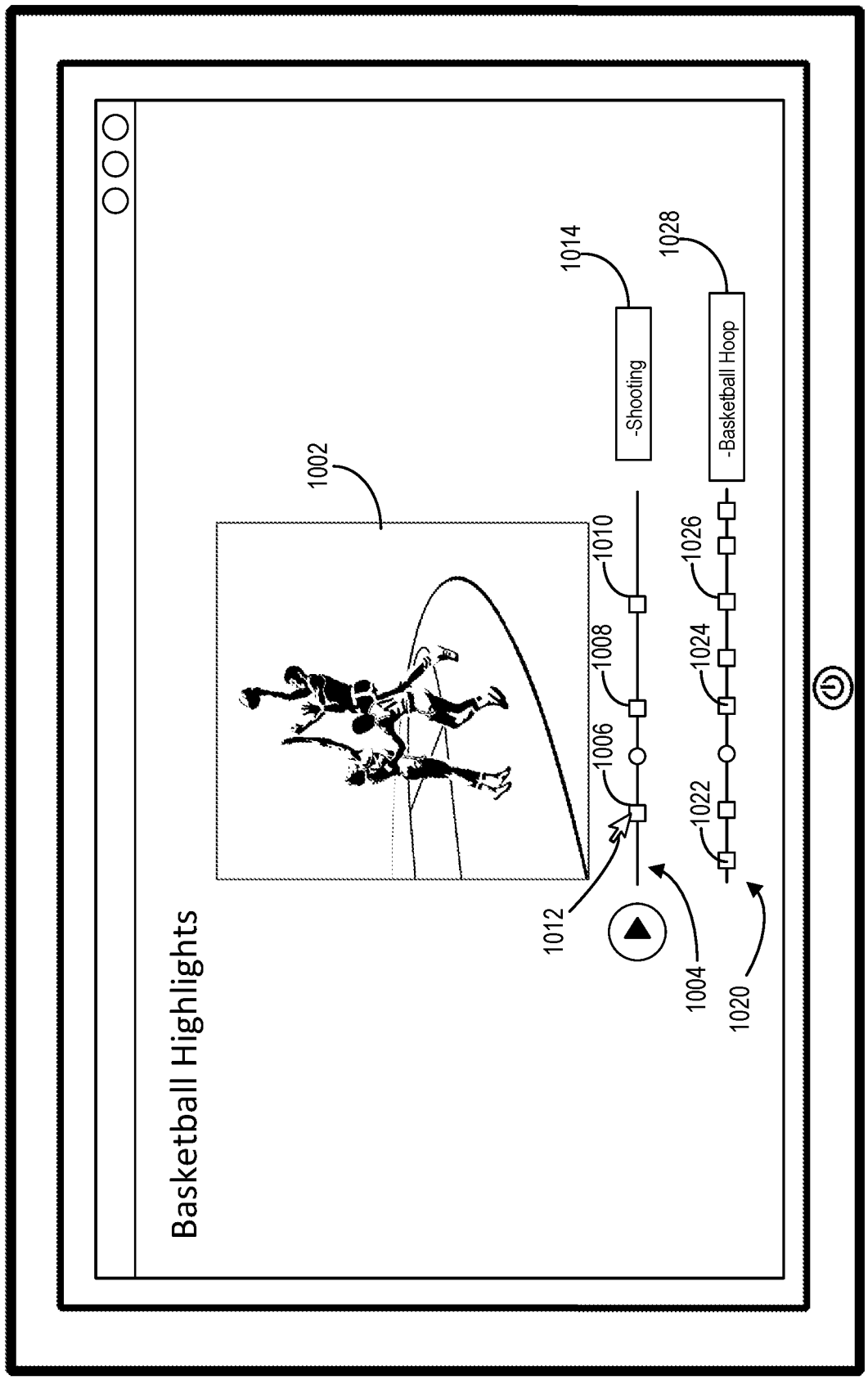
FIG. 10 illustrates the digital video tagging system utilizing tagged segments of a digital video in an example digital video player in accordance with one or more embodiments.

In addition, as mentioned above, the digital video tagging system 106 can indicate specific tags at one or more segments of a digital video (e.g., at a temporal location of the digital video). For instance, FIG. 10 illustrates the digital video tagging system 106 indicating tags within a digital video player for a tagged digital video. In particular, the digital video tagging system 106 can utilize tags associated with frames and/or segments of a tagged digital video (e.g., generated and/or associated in accordance with one or more embodiments herein) to display the tags in one or more segments (or temporal locations) of the tagged digital video.

As an example, FIG. 10 illustrates the digital video tagging system 106 indicating tags within a digital video for a tagged digital video. For instance, as shown in FIG. 10, the digital video tagging system 106 causes a first timeline 1004 to display action tag indicators 1006, 1008, and 1010 for a tagged digital video 1002 and object tag indicators 1022, 1024, 1026. For example, the digital video tagging system 106 can receive a query to identify segments or portions of a video involving an action (e.g., shooting) that include a particular object (e.g., basketball hoop). In response, as shown in FIG. 10, the digital video tagging system 106 can cause a digital video player to display tags associated with the action and the object. In particular, the digital video tagging system 106 can present the first timeline 1004 and a second timeline 1020. The digital video tagging system 106 can then place action tag indicators 1006, 1008, 1010 at locations along the first timeline 1004 corresponding to frames or segments of the video including the action (e.g., shooting 1014). Similarly, the digital video tagging system 106 can then place object tag indicators 1022, 1024, 1026 at locations along the second timeline 1020 corresponding to frames or segments of the video including the object (e.g., basketball hoop 1028). Optionally, the digital video tagging system 106 can further surface or display the confidence values with the tag indicators to allow a user to see how sure the digital video tagging system 106 is that a temporal segment is associated with a given tag.

As illustrated in FIG. 10, the digital video tagging system 106 can allow a user to scrub through a video to segments of the video including a target action/object. In particular, the digital video tagging system can provide user interface of FIG. 10, which as the timeline and tag indicators. Thus, the digital video tagging system allows a user to scrub through the video using the tag indicators. Otherwise, the digital video tagging system can receive a search term (e.g., an action) from a user. In response, the digital video tagging system can identify a segment of the video corresponding to the search term and advance the video to the identified segment. Additionally, the digital video tagging system 106 can display a tag associated with a tag indicator upon receiving a user interaction 1012, such as, but not limited to, a mouse over action (e.g., the digital video tagging system 106 can display the shooting 1014 upon receiving a user interaction 1012).

Figure 11:
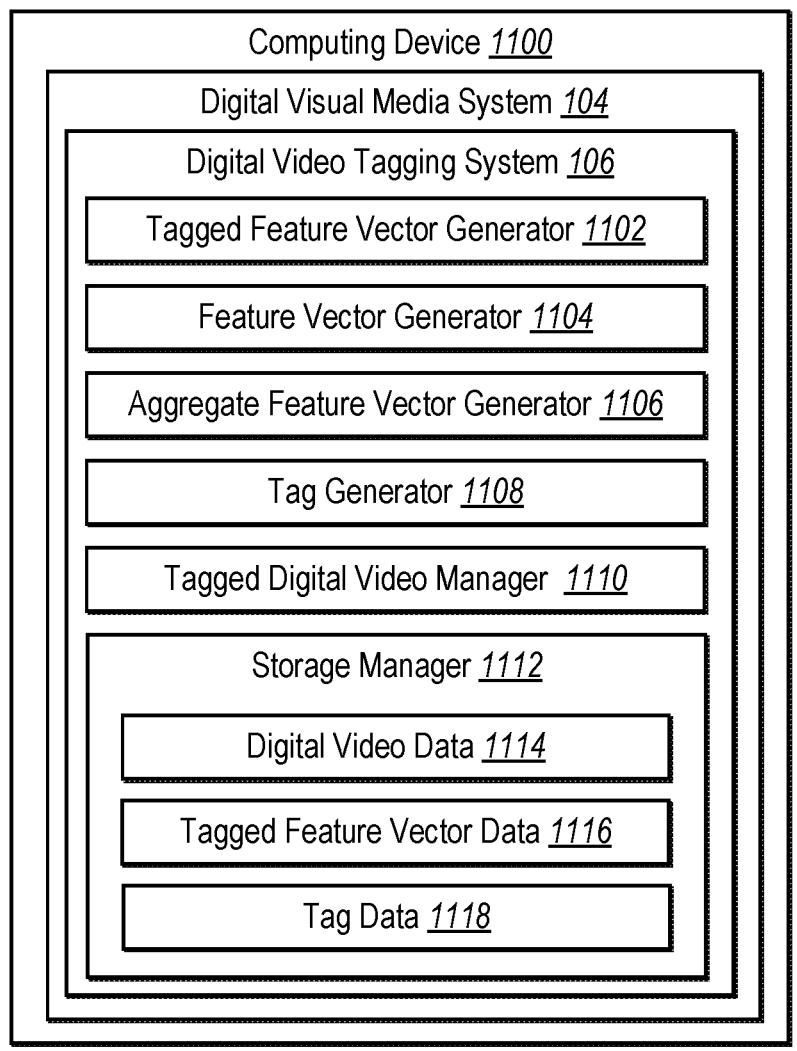
FIG. 11 illustrates a schematic diagram of a digital video tagging system in accordance with one or more embodiments.

Turning now to FIG. 11, additional detail will be provided regarding components and capabilities of one embodiment of the digital video tagging system. In particular, FIG. 11 illustrates an embodiment of an example digital video tagging system 106 executed by a computing device 1100 (e.g., a server and/or client device). As shown by the embodiment in FIG. 11, the computing device 1100 includes or hosts the digital visual media system 104 and the digital video tagging system 106. The digital video tagging system 106 can include a tagged feature vector generator 1102, a feature vector generator 1104, an aggregated feature vector generator 1106, a tag generator 1108, and a tagged digital video manager 1110, and a storage manager 1112 which includes digital video data 1114, tagged feature vector data 1116, and tag data 1118.

As just mentioned, and as illustrated in by the embodiment FIG. 11, the digital video tagging system 106 can include a tagged feature vector generator 1102. For instance, the tagged feature vector generator 1102 can receive digital videos, select digital videos (e.g., action-rich digital videos), generate tagged feature vectors for digital videos, and/or generate a tagged feature vector storage (e.g., a query hash table) as described in one or more figures above, such as, but not limited to, FIG. 4. Additionally, the tagged feature vector generator 1102 can include one or more machine learning models (e.g., a neural network) to generate tagged feature vectors for the digital video tagging system 106.

Furthermore, as shown by the embodiment in FIG. 11, the digital video tagging system 106 can include the feature vector generator 1104. For example, the feature vector generator 1104 can generate feature vectors for digital videos. In particular, the feature vector generator 1104 can extract frames from a digital video and utilize a neural network to generate feature vectors from the extracted frames as described in one or more figures above, such as, but not limited to, FIGS. 4, 5A-5B, 6A-6B, 7, and 8. Additionally, the feature vector generator 1104 can include one or more machine learning models (e.g., a neural network) to generate feature vectors for the digital video tagging system 106.

Additionally, as illustrated in the embodiment of FIG. 11, the digital video tagging system 106 can include an aggregated feature vector generator 1106. For instance, the aggregated feature vector generator 1106 can combine feature vectors to generate an aggregated feature vector. In particular, the aggregated feature vector generator 1106 can combine feature vectors utilizing methods such as, but not limited to, max pooling to generate an aggregated feature vector as described in one or more figures above, such as, but not limited to FIGS. 5A-5B, 6A-6B, 7, and 8. Additionally, the aggregated feature vector generator 1106 can include one or more machine learning models (e.g., a neural network) to generate aggregated feature vectors for the digital video tagging system 106.

Moreover, as shown by the embodiment in FIG. 11, the digital video tagging system 106 can include a tag generator 1108. For example, the tag generator 1108 can generate tags for a digital video based on feature vectors of the digital video and tagged feature vectors. In particular, the tag generator 1108 can compare feature vectors of a digital video with tagged feature vectors to identify similarities between the feature vectors of the digital video and the tagged feature vectors as described in one or more figures above, such as, but not limited to FIGS. 4, 5A-5B, 6A-6B, 7, and 8. Furthermore, the tag generator 1108 can utilize identified similar tagged feature vectors to identify tags and propagate the identified tags to the digital video as described in one or more figures above, such as, but not limited to FIGS. 4, 5A-5B, 6A-6B, 7, and 8. Additionally, the tag generator 1108 can include one or more machine learning models (e.g., a neural network) to identify similar tagged feature vectors and/or to generate tags for a digital video for the digital video tagging system 106.

In addition, as shown in the embodiment of FIG. 11, the digital video tagging system 106 can include a tagged digital video manager 1110. For instance, the tagged digital video manager 1110 can enable functionalities for digital videos based on tags associated with the digital videos as described in one or more figures above, such as, but not limited to FIGS. 9 and 10.

Furthermore, as illustrated in FIG. 11, the digital video tagging system 106 can include the storage manager 1112. The storage manager 1112 can maintain data to perform the one or more functions of the digital video tagging system 106. As illustrated, the storage manager 1112 can include digital video data 1114 (e.g., digital videos utilized for at least training a neural network to identify tags and/or generating one or more tagged feature vectors), tagged feature vector data 1116 (e.g., tagged feature vectors, such as tagged feature vectors in the tagged feature vector storage 108, utilized for at least tagging one or more digital videos and/or training a neural network to tag one or more digital videos), and tag data 1118 (e.g., tag data that is generated for digital videos by the digital video tagging system 106 and utilized for at least tagging digital videos and/or enabling functionalities for digital videos).

Each of the components 1102-1118 of the computing device 1100 (e.g., the computing device 1100 implementing the digital video tagging system 106), as shown in FIG. 11, may be in communication with one another using any suitable communication technologies. It will be recognized that although components 1102-1118 of the computing device 1100 are shown to be separate in FIG. 11, any of components 1102-1118 may be combined into fewer components, such as into a single facility or module, divided into more components, or configured into different components as may serve a particular embodiment.

The components 1102-1118 of the computing device 1100 can comprise software, hardware, or both. For example, the components 1102-1118 can comprise one or more instructions stored on a computer-readable storage medium and executable by processors of one or more computing devices. When executed by the one or more processors, the computer-executable instructions of the digital video tagging system 106 (e.g., via the computing device 1100) can cause a client device and/or a server device to perform the methods described herein. Alternatively, the components 1102-1118 and their corresponding elements can comprise hardware, such as a special purpose processing device to perform a certain function or group of functions. Additionally, the components 1102-1118 can comprise a combination of computer-executable instructions and hardware.

Furthermore, the components 1102-1118 of the digital video tagging system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1102-1118 may be implemented as a stand-alone application, such as a desktop or mobile application. Furthermore, the components 1102-1118 may be implemented as one or more web-based applications hosted on a remote server. The components 1102-1118 may also be implemented in a suite of mobile device applications or "apps." To illustrate, the components 1102-1118 may be implemented in an application, including but not limited to, ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE," "ADOBE ANALYTICS CLOUD," "ADOBE ANALYTICS," "ADOBE AUDIENCE MANAGER," "ADOBE CAMPAIGN," "ADOBE EXPERIENCE MANAGER," and "ADOBE TARGET" are either registered trademarks or trademarks of Adobe Inc. in the United States and/or other countries.

Figure 12:
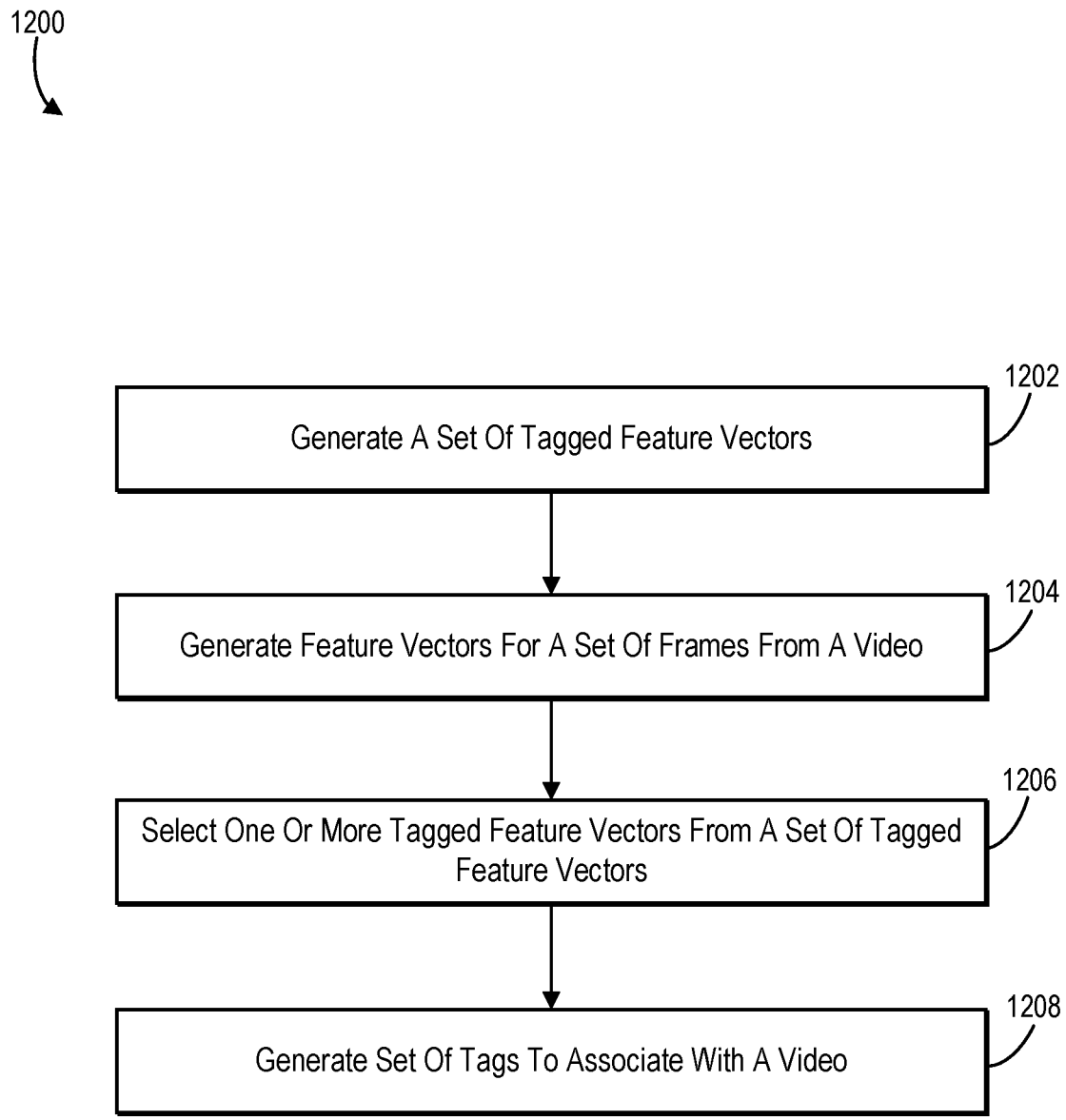
FIG. 12 illustrates a flowchart of a series of acts for automatic tagging of videos in accordance with one or more embodiments.

FIGS. 1-11, the corresponding text, and the examples provide a number of different methods, systems, devices, and non-transitory computer-readable media of the digital video tagging system 106. In addition to the foregoing, one or more embodiments can also be described in terms of flowcharts comprising acts for accomplishing a particular result, as shown in FIG. 12. FIG. 12 may be performed with more or fewer acts. Further, the acts may be performed in differing orders. Additionally, the acts described herein may be repeated or performed in parallel with one another or parallel with different instances of the same or similar acts.

As mentioned, FIG. 12 illustrates a flowchart of a series of acts 1200 for automatic tagging of videos in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer-readable medium can comprise instructions that, when executed by one or more processors, cause a computing device to perform the acts of FIG. 12. In some embodiments, a system can perform the acts of FIG. 12.

As illustrated in FIG. 12, the series of acts 1200 includes an act 1202 of generating a set of tagged feature vectors. In particular, the act 1202 can include generating a set of tagged feature vectors by identifying one or more media content items, generating, utilizing a neural network, one or more tagged feature vectors for the one or more media content items, assigning one or more tags to the one or more tagged feature vectors, and associating the one or more tagged feature vectors with the set of tagged feature vectors. For instance, the media content items can include text representing one or more verbs. Furthermore, the tags can be associated with the one or more verbs. Moreover, the act 1202 can include identifying a media content item which includes text representing one or more verbs by identifying one or more gerunds within text associated with the media content item. Furthermore, the act 1202 can include generating the one or more tagged feature vectors from one or more videos associated with actions. Additionally, the act 1202 can include assigning one or more tags to one or more tagged feature vectors by assigning one or more verbs to the one or more tagged feature vectors. Moreover, the act 1202 can include assigning tags to a tagged feature vector by assigning one or more verbs to the tagged feature vector and associating the tagged feature vector with a set of tagged feature vectors.

As illustrated in FIG. 12, the series of acts 1200 includes an act 1204 of generating feature vectors for a set of frames from a video. In particular, the act 1204 can include extracting a set of frames from a video. Furthermore, the act 1204 can include generating, utilizing a neural network, feature vectors for a set of frames. Additionally, the act 1204 can include generating feature vectors for a set of frames by generating, utilizing a neural network, a set of initial feature vectors and generating an aggregated feature vector based on the set of initial feature vectors. For instance, the set of initial feature vectors can include a feature vector for each frame from a set of frames. Furthermore, the act 1204 can include generating an aggregated feature vector based on the set of tagged feature vectors. Moreover, the act 1204 can include generating an aggregated feature vector by combining a set of initial feature vectors utilizing max pooling. In addition, the act 1204 can include generating an aggregated feature vector by combining a set of initial feature vectors utilizing averaging. Moreover, the neural network can include a convolutional neural network.

Additionally, the act 1204 can include performing a step for generating an aggregated feature vector from feature vectors. Moreover, the act 1204 can include performing a step for generating an aggregated feature vector from feature vectors by combining the feature vectors by utilizing max pooling.

As illustrated in FIG. 12, the series of acts 1200 includes an act 1206 of selecting one or more tagged feature vectors from a set of tagged feature vectors. In particular, the act 1206 can include selecting one or more tagged feature vectors and generating a set of tags to associate with a video by aggregating one or more tags corresponding to the one or more tagged feature vectors. In addition, the act 1206 can include selecting one or more tagged feature vectors from a set of tagged feature vectors based on distances between the feature vectors and one or more tagged feature vectors from the set of tagged feature vectors. Additionally, the act 1206 can include selecting one or more tags associated with one or more tagged feature vectors from a set of tagged feature vectors based on determined distance values by utilizing a k-nearest neighbor algorithm. Moreover, the act 1206 can include determining one or more tagged feature vectors similar to an aggregated feature vector. In addition, the act 1206 can include selecting one or more tagged feature vectors from a set of tagged feature vectors based on distances between an aggregated feature vector and one or more tagged feature vectors from the set of tagged feature vectors. Additionally, the act 1206 can include selecting one or more tagged feature vectors from a set of tagged feature vectors by determining distance values between feature vectors and the one or more tagged feature vectors from the set of tagged feature vectors and selecting the one or more tagged feature vectors that correspond to distance values that meet a threshold distance value.

As illustrated in FIG. 12, the series of acts 1200 includes an act 1208 of generating a set of tags to associate with a video. Moreover, the act 1208 can include generating a set of tags to associate with a video from one or more tagged feature vectors. Furthermore, the act 1208 can include generating a set of tags to associate with a video (from the one or more tagged feature vectors) by aggregating one or more tags corresponding to one or more tagged feature vectors. In addition, the act 1208 can include generating a set of tags to associate with a video from action based tags corresponding to one or more tagged feature vectors.

Furthermore, the act 1208 can include generating the set of tags to associate with the video by aggregating the one or more tags associated with (or corresponding to) the one or more tagged feature vectors from the set of tagged feature vectors based on the determined distance values. Moreover, the act 1208 can include generating a set of tags to associate with a video by determining distance values between feature vectors for a set of frames and one or more tagged feature vectors from a set of tagged feature vectors and selecting the one or more tags associated with the one or more tagged feature vectors from the set of tagged feature vectors based on the determined distance values. Furthermore, the act 1208 can include generating a set of tags associated with a video by determining a distance value between an aggregated feature vector and one or more tagged feature vectors from a set of tagged feature vectors.

Additionally, the act 1208 can include assigning a tag with a frame from the set of frames from the video. Furthermore, the act 1208 can include assigning a tag with a frame from a set of frames from the video by identifying a feature vector, from feature vectors for a set of frames, that corresponds to the frame, selecting one or more tagged feature vectors from a set of tagged feature vectors based on distances between the identified feature vector and the one or more tagged feature vectors from the set of tagged feature vectors, selecting the tag from the one or more tags corresponding to selected one or more tagged feature vectors, and assigning the tag with the frame from the set of frames from the video.

Moreover, the act 1208 can include associating a set of tags with a temporal segment of a video comprising the set of frames. Furthermore, the act 1208 can also include providing a graphical user interface displaying the video. In addition, the act 1208 can include providing a timeline for the video in the graphical user interface. Additionally, the act 1208 can include placing a tag indicator associated with a tag of the set of tags on the timeline at a position corresponding to the temporal segment of the video.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium.

Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
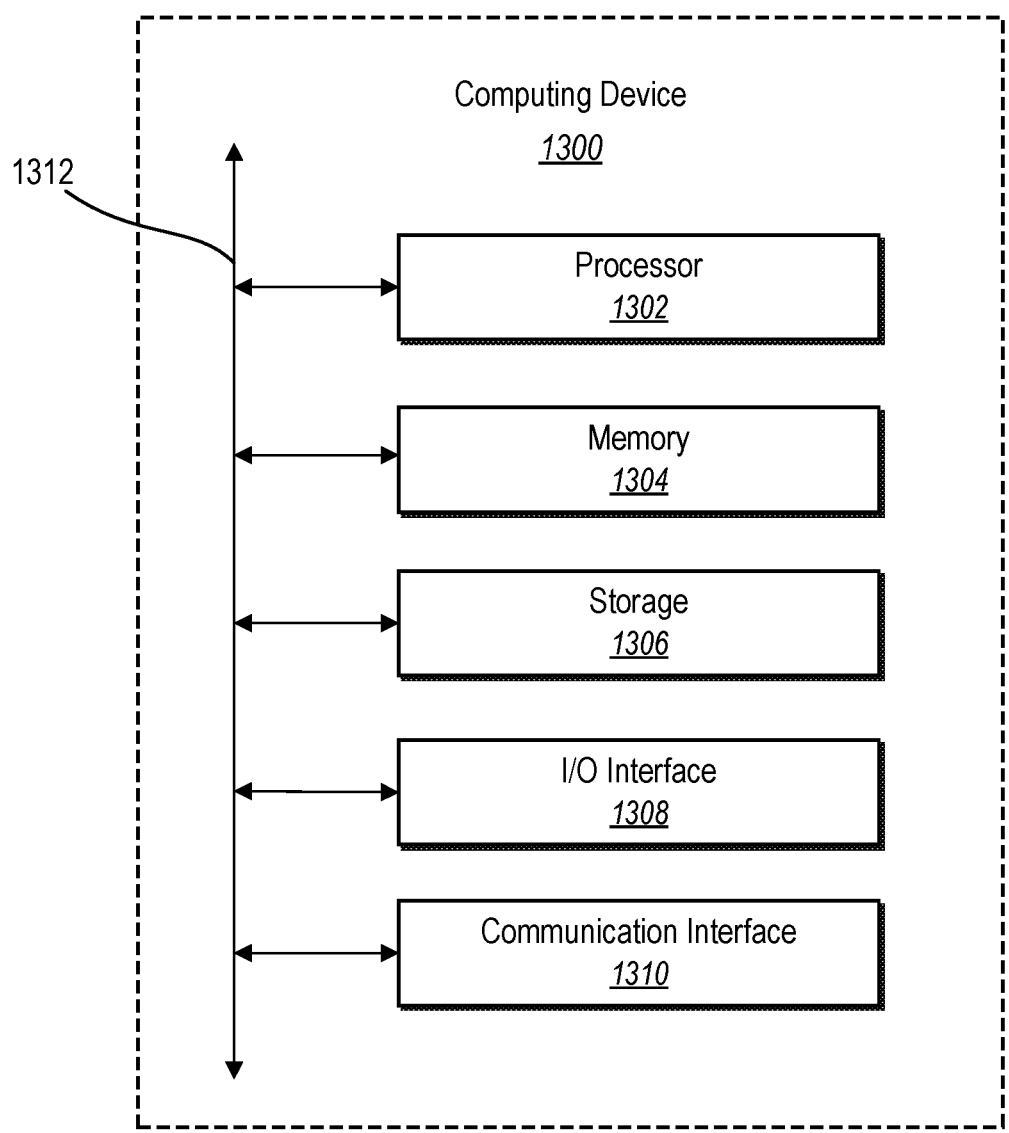
FIG. 13 illustrates a block diagram of an example computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., computing device 1100, server device(s) 102 and client devices 112). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments.

Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer system to:
   extract a set of frames from a video;
   generate, utilizing a neural network, feature vectors for the set of frames;
   identify a set of tagged feature vectors corresponding to a set of media content items, the set of tagged feature vectors comprising feature vectors generated from particular media content items and tagged with labels that correspond to the particular media content items;
   select one or more tagged feature vectors from the set of tagged feature vectors based on distances between the feature vectors and the one or more tagged feature vectors from the set of tagged feature vectors; and
   generate a set of tags to associate with the video by:
      selecting tags from the one or more tagged feature vectors; and
      aggregating the tags selected from the one or more tagged feature vectors.

2. The non-transitory computer-readable medium of claim 1, further comprising instructions that, when executed by the at least one processor, cause the computer system to:
   generate the feature vectors for the set of frames by:
      generating, utilizing the neural network, a set of initial feature vectors, wherein the set of initial feature vectors comprise a feature vector for each frame from the set of frames; and
      generating an aggregated feature vector based on the set of initial feature vectors; and
   select the one or more tagged feature vectors from the set of tagged feature vectors based on distances between the aggregated feature vector and the one or more tagged feature vectors from the set of tagged feature vectors.

3. The non-transitory computer-readable medium of claim 1, wherein each feature vector within the set of tagged feature vectors is generated from a media content item and tagged with labels that describe depictions within a particular media content item.

4. The non-transitory computer-readable medium of claim 1, further comprising instructions that, when executed by the at least one processor, cause the computer system to:
   select the one or more tagged feature vectors from the set of tagged feature vectors by:
      determining distance values between the feature vectors and the one or more tagged feature vectors from the set of tagged feature vectors; and
      selecting the one or more tagged feature vectors that correspond to distance values that meet a threshold distance value.

5. The non-transitory computer-readable medium of claim 1, further comprising instructions that, when executed by the at least one processor, cause the computer system to identify the set of tagged feature vectors from one or more videos associated with actions.

6. The non-transitory computer-readable medium of claim 1, further comprising instructions that, when executed by the at least one processor, cause the computer system to generate the set of tags to associate with the video by aggregating action based tags corresponding to the one or more tagged feature vectors.

7. The non-transitory computer-readable medium of claim 1, further comprising instructions that, when executed by the at least one processor, cause the computer system to identify the set of tagged feature vectors by:
   identifying a media content item comprising text representing one or more verbs;
   generating, utilizing the neural network, a tagged feature vector for the media content item;
   assigning tags to the tagged feature vector by assigning the one or more verbs to the tagged feature vector; and
   associating the tagged feature vector with the set of tagged feature vectors.

8. The non-transitory computer-readable medium of claim 1, further comprising instructions that, when executed by the at least one processor, cause the computer system to associate the set of tags with a temporal segment of the video comprising the set of frames.

9. The non-transitory computer-readable medium of claim 8, further comprising instructions that, when executed by the at least one processor, cause the computer system to:
   provide graphical user interface displaying the video;
   provide a timeline for the video in the graphical user interface; and
   place a tag indicator associated with a tag of the set of tags on the timeline at a position corresponding to the temporal segment of the video.

10. The non-transitory computer-readable medium of claim 7, further comprising instructions that, when executed by the at least one processor, cause the computer system to identify the media content item comprising text representing one or more verbs by identifying one or more gerunds within text associated with the media content item.

11. A system comprising:
memory comprising a neural network and a set of tagged feature vectors corresponding to a set of media content items, the set of tagged feature vectors comprising feature vectors generated from particular media content items and tagged with labels that correspond to the particular media content items;
at least one processor; and
at least one non-transitory computer-readable storage medium storing instructions that, when executed by the at least one processor, cause the system to:
extract a set of frames from a video;
generate, utilizing the neural network, feature vectors for the set of frames; and
generate a set of tags to associate with the video by:
determining distance values between the feature vectors for the set of frames and one or more tagged feature vectors from the set of tagged feature vectors;
selecting tags from the one or more tagged feature vectors from the set of tagged feature vectors based on the determined distance values; and
aggregating the tags selected from the one or more tagged feature vectors.

12. The system of claim 11, further comprising instructions that, when executed by the at least one processor, cause the system to:
generate the feature vectors for the set of frames by:
generating, utilizing the neural network, a set of initial feature vectors, wherein the set of initial feature vectors comprise a feature vector for each frame from the set of frames; and
generating an aggregated feature vector based on the set of initial feature vectors; and
generate the set of tags associated with the video by determining the distance values between the aggregated feature vector and the one or more tagged feature vectors from the set of tagged feature vectors.

13. The system of claim 12, wherein generating the aggregated feature vector comprises combining the set of initial feature vectors utilizing averaging or max pooling.

14. The system of claim 11, further comprising instructions that, when executed by the at least one processor, cause the system to select the one or more tags associated with the one or more tagged feature vectors from the set of tagged feature vectors based on the determined distance values by utilizing a k-nearest neighbor algorithm.

15. The system of claim 11, further comprising instructions that, when executed by the at least one processor, cause the system to generate the set of tags to associate the set of tags with a temporal segment of the video comprising the set of frames.

16. A computer-implemented method for automatic tagging of videos, the computer-implemented method comprising:
extracting a set of frames from a video;
generating, utilizing a neural network, feature vectors for the set of frames;
performing a step for generating an aggregated feature vector from the feature vectors;
determining one or more tagged feature vectors similar to the aggregated feature vector based on distances between the aggregated feature vector and the one or more tagged feature vectors, wherein the one or more tagged feature vectors are associated with an identified set of tagged feature vectors corresponding to a set of media content items and comprising feature vectors generated from particular media content items and tagged with labels that correspond to the particular media content items; and
generating a set of tags to associate with the video by:
selecting tags from the one or more tagged feature vectors based on the distances between the aggregated feature vector and the one or more tagged feature vectors; and
aggregating the tags selected from the one or more tagged feature vectors.

17. The computer-implemented method of claim 16, wherein performing the step for generating the aggregated feature vector from the feature vectors comprises combining the feature vectors by utilizing max pooling.

18. The computer-implemented method of claim 16, further comprising determining the one or more tagged feature vectors that are similar to the aggregated feature vector based on the distances utilizing a k-nearest neighbor algorithm.

19. The computer-implemented method of claim 16, further comprising generating the set of tags to associate with the video from action based tags corresponding to the one or more tagged feature vectors.

20. The computer-implemented method of claim 16, further comprising identifying the one or more tagged feature vectors from one or more videos associated with actions.

* * * * *